United States Patent
Valenta et al.

(10) Patent No.: US 9,926,663 B2
(45) Date of Patent: Mar. 27, 2018

(54) TREATED TEXTILE MATERIAL AND PROCESS FOR PRODUCING THE SAME

(71) Applicant: MILLIKEN & COMPANY, Spartanburg, SC (US)

(72) Inventors: Petr Valenta, Greer, SC (US); Rajib Mondal, Greer, SC (US); James A. Rogers, Greenville, SC (US); Michael Todd Moore, Boiling Springs, SC (US); Jason M. Spruell, Spartanburg, SC (US); Keith A. Keller, Spartanburg, SC (US); Warren W. Gerhardt, Greer, SC (US); Nathan B. Emery, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 573 days.

(21) Appl. No.: 14/460,937

(22) Filed: Aug. 15, 2014

(65) Prior Publication Data
US 2015/0050855 A1    Feb. 19, 2015

Related U.S. Application Data

(60) Provisional application No. 61/867,567, filed on Aug. 19, 2013.

(51) Int. Cl.
*D06M 15/667*    (2006.01)
*D06M 15/687*    (2006.01)
(Continued)

(52) U.S. Cl.
CPC .......... *D06M 15/667* (2013.01); *C08K 5/00* (2013.01); *C09K 21/14* (2013.01); *D03D 15/12* (2013.01);
(Continued)

(58) Field of Classification Search
USPC .......................................... 442/142, 143, 141
See application file for complete search history.

(56) References Cited

U.S. PATENT DOCUMENTS

| 4,095,945 A | 6/1978 | Umetani et al. |
| 4,918,795 A | 4/1990 | Dischler |

(Continued)

FOREIGN PATENT DOCUMENTS

| WO | WO 2012/158369 A1 | 11/2012 |
| WO | WO 2013/062683 A2 | 5/2013 |

OTHER PUBLICATIONS

Vail, et al., "Chemistry of Hydroxymethyl Phosphorus Compounds, Part I: Introduction," *Textile Research Journal*, pp. 671-677, 1982, Textile Research Institute, Southern Regional Research Center, New Orleans, LA 70179.

(Continued)

*Primary Examiner* — Lynda Salvatore
(74) *Attorney, Agent, or Firm* — Robert M. Lanning

(57) ABSTRACT

An article comprises a textile material and a flame retardant, phosphorus-containing polymer. The flame retardant, phosphorus, containing polymer can be present in the form of a plurality of microprotuberances. The flame retardant, phosphorus, containing polymer can contain a relatively low amount of residual hydroxyalkyl groups bonded to the phosphorus atoms in the polymer. A process for producing a treated textile material is also provided.

30 Claims, 10 Drawing Sheets

(51) Int. Cl.
*C08K 5/00* (2006.01)
*C09K 21/14* (2006.01)
*D03D 15/12* (2006.01)
*D06M 13/285* (2006.01)
*D06M 15/431* (2006.01)

(52) U.S. Cl.
CPC ........ *D06M 13/285* (2013.01); *D06M 15/431* (2013.01); *D06M 15/687* (2013.01); *D06M 2200/30* (2013.01); *Y10T 442/268* (2015.04); *Y10T 442/2672* (2015.04)

(56) References Cited

U.S. PATENT DOCUMENTS

| | | | |
|---|---|---|---|
| 5,033,143 | A | 7/1991 | Love, III |
| 6,546,605 | B1 | 4/2003 | Emery et al. |
| 7,182,991 | B1 | 2/2007 | Hirschmann, Jr. et al. |
| 7,713,891 | B1 | 5/2010 | Li et al. |
| 8,012,890 | B1 | 9/2011 | Li et al. |
| 8,012,891 | B2 | 9/2011 | Li et al. |
| 8,722,551 | B2 * | 5/2014 | Mayernik ............... C09K 21/14 428/920 |
| 2005/0130533 | A1 | 6/2005 | Lapierre |
| 2008/0057807 | A1 | 3/2008 | Tutterow et al. |
| 2010/0299817 | A1 | 12/2010 | Zhu |
| 2011/0092119 | A1 | 4/2011 | Cliver et al. |
| 2011/0250810 | A1 | 10/2011 | Zhu |
| 2012/0286177 | A1 | 11/2012 | Cliver et al. |
| 2014/0357146 | A1 | 12/2014 | Gerhardt et al. |

OTHER PUBLICATIONS

Frank, et al., "Chemistry of Hydroxymethyl Phosphorus Compounds, Part II: Phosphonium Salts," *Textile Research Journal*, pp. 678-693, 1982, Textile Research Institute, Southern Regional Research Center, New Orleans, LA 70179.

Frank, et al., "Chemistry of Hydroxymethyl Phosphorus Compounds, Part III: Phosphines, Phosphine Oxides, and Phosphonium Hydroxides," *Textile Research Journal*, pp. 738-750, 1982, Textile Research Institute, Southern Regional Research Center, New Orleans, LA 70179.

Daigle, et al., "Chemistry of Hydroxymethyl Phosphorus Compounds, Part IV: Ammonia, Amines, and THPOH: A Chemical Approach to Flame Retardancy," *Textile Research Journal*, pp. 751-755, Dec. 1982, Textile Research Institute, Southern Regional Research Center, New Orleans, LA 70179.

PCT/US2014/051579 International Search Report, International filing date Aug. 19, 2014, 3 pages.

PCT/US2014/051579 Written Opinion of the International Search Authority, International filing date Aug. 19, 2014, 5 pages.

* cited by examiner

TREATED TEXTILE MATERIAL AND PROCESS FOR PRODUCING THE SAME

CROSS REFERENCE TO RELATED APPLICATIONS

This application claims, pursuant to 35 U.S.C. § 119(e)(1), priority to and the benefit of the filing date of U.S. Patent Application No. 61/867,567 filed on Aug. 19, 2013, which application is hereby incorporated by reference in its entirety.

TECHNICAL FIELD

This application relates to textile materials that have been treated with a flame retardant polymer and processes for producing such textile materials.

BACKGROUND

Flame resistant fabrics are useful in many applications, including the production of garments worn by personnel in a variety of industries or occupations, such as the military, electrical (for arc protection), petroleum chemical manufacturing, and emergency response fields. Cellulosic or cellulosic-blend fabrics have typically been preferred for these garments, due to the availability of chemical treatments designed to render these fabrics flame resistant and the relative comfort of such fabrics to the wearer.

Notwithstanding the popularity of cellulosic or cellulosic-blend flame resistant fabrics, existing fabrics do suffer from limitations. The flammability performance of many cellulosic flame resistant fabrics is not sufficient to meet the demanding requirements of certain industries. In order to meet these requirements, inherent flame resistant fibers (e.g., meta-aramid fibers, such as NOMEX® fiber from E.I. du Pont de Nemours and Company) are often employed, which increases the cost of the fabrics. Accordingly, a need remains to provide alternative flame retardant compounds that can be used to improve the flame resistance of fabrics. A need also remains for flame resistant fabrics that have been treated with such flame retardant compounds and are capable of meeting applicable flame resistance standards. The inventions described in this application seek to meet such needs.

BRIEF SUMMARY OF THE INVENTION

In a first embodiment, the invention provides a treated textile material comprising:
(a) a textile material, the textile material comprising a plurality of textile fibers, each of the textile fibers having a surface; and
(b) a flame retardant, phosphorus-containing polymer disposed on at least a portion of the surface of at least a portion of the textile fibers, wherein at least a portion of the flame retardant, phosphorus-containing polymer is present in the form of a plurality of microprotuberances protruding from the surface of the textile fibers, wherein each microprotuberance has a diameter of about 10 microns or less.

In a second embodiment, the invention provides an article comprising
(a) a textile material, the textile material comprising a plurality of textile fibers, each of the textile fibers having a surface; and
(b) a flame retardant, phosphorus-containing polymer disposed on at least a portion of the surface of at least a portion of the textile fibers, wherein the flame retardant, phosphorous containing polymer is produced by a process comprising the steps of:
(1) providing a phosphonium compound comprising at least one phosphonium moiety, the phosphonium moiety conforming to the structure of Formula (I)

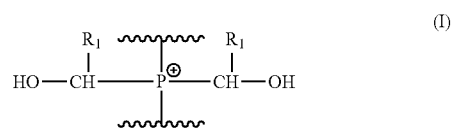

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl;
(2) providing a nitrogen-containing cross-linking compound, the nitrogen-containing cross-linking compound comprising two or more nitrogen-hydrogen bonds;
(3) reacting the phosphorus-containing compound and the nitrogen-containing cross-linking compound in a condensation reaction to produce a first intermediate polymer, the first intermediate polymer comprising a plurality of phosphorus atoms; and
(4) oxidizing the first intermediate polymer to convert at least a portion of the phosphorus atoms in the first intermediate polymer to a pentavalent, phosphine oxide state, thereby producing a flame-retardant, phosphorus-containing polymer comprising a plurality of phosphorus atoms having functional groups attached thereto; and
wherein 10% or less of the functional groups attached to the phosphorus atoms in the flame retardant, phosphorus-containing polymer are hydroxyalkyl groups.

In a third embodiment, the invention provides a process for producing a treated textile material, the process comprising the steps of:
(a) providing a textile material, the textile material comprising a plurality of textile fibers, each of the textile fibers having a surface;
(b) providing a treatment composition, the treatment composition comprising:
(i) a phosphonium compound comprising at least one phosphonium moiety, the phosphonium moiety conforming to the structure of Formula (I)

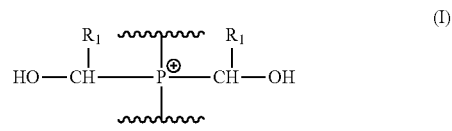

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; and
(ii) a nitrogen-containing cross-linking compound, the nitrogen-containing cross-linking compound comprising two or more nitrogen-hydrogen bonds;
(c) placing the treatment composition in a reservoir where the treatment composition is heated to a temperature sufficient for the phosphonium compound and the nitrogen-containing cross-linking compound to begin to react in a condensation reaction to produce a phosphorus-containing polymer;

(d) circulating the treatment composition from the reservoir through a passage to produce a circulating flow of the treatment composition;

(e) passing the textile material through the circulating flow of treatment composition so that the textile material is entrained in the flow and circulated through the treatment composition in the reservoir;

(f) allowing the textile material to circulate through the reservoir for an amount of time sufficient for the phosphorus-containing polymer to deposit on at least a portion of the surface of at least a portion of the textile fibers, thereby producing a treated textile material.

DETAILED DESCRIPTION OF THE INVENTION

Figure 1:
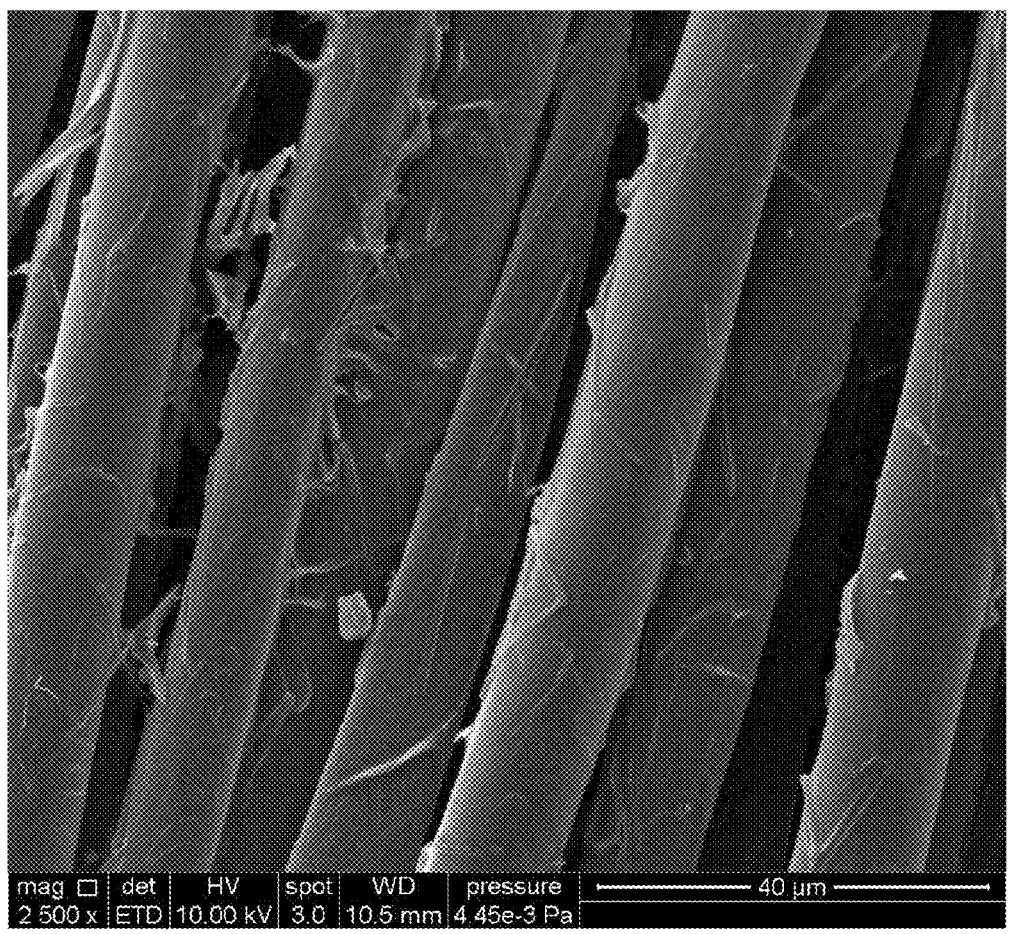
FIG. 1 is a scanning electron microscope (SEM) image (2,500 times magnification) of the surface of textile fibers in a commercially-available fabric treated with a flame retardant, phosphorus-containing.

In a first embodiment, the invention provides an article comprising a textile material. The textile material comprises a plurality of textile fibers. These fibers can be either staple fibers, filaments, or a mixture of the two.

The textile material used in this embodiment of the invention can be any suitable textile material. The textile material generally comprises a fabric formed from one or more pluralities or types of yarns. The textile material can be formed from a single plurality or type of yarn (e.g., the fabric can be formed solely from yarns comprising a blend of cellulosic fibers and synthetic fibers, such as polyamide fibers), or the textile material can be formed from several pluralities or different types of yarns (e.g., the fabric can be formed from a first plurality of yarns comprising cellulosic fibers and polyamide fibers and a second plurality of yarns comprising an inherent flame resistant fiber).

The yarns used in making the textile materials of the invention can be any suitable type of yarn. Preferably, at least a portion of the yarns are spun yarns. In such embodiments, the spun yarns can be made from a single type of staple fiber (e.g., spun yarns formed solely from cellulose fibers), or the spun yarns can be made from a blend of two or more different types of staple fibers (e.g., spun yarns formed from a blend of cellulose fibers and thermoplastic synthetic staple fibers, such as polyamide fibers). Such spun yarns can be formed by any suitable spinning process, such as ring spinning, air-jet spinning, or open-end spinning. In certain embodiments, the yarns are spun using a ring spinning process (i.e., the yarns are ring spun yarns).

The textile materials of the invention can be of any suitable construction. In other words, the yarns forming the textile material can be provided in any suitable patternwise arrangement producing a fabric. For example, the textile materials can be provided in a woven construction, such as a plain weave, basket weave, twill weave, satin weave, or sateen weave. Suitable plain weaves include, but are not limited to, ripstop weaves produced by incorporating, at regular intervals, extra yarns or reinforcement yarns in the warp, fill, or both the warp and fill of the textile material during formation. Suitable twill weaves include both warp-faced and fill-faced twill weaves, such as 2/1, 3/1, 3/2, 4/1, 1/2, 1/3, or 1/4 twill weaves. In certain embodiments of the invention, such as when the textile material is formed from two or more pluralities or different types of yarns, the yarns are disposed in a patternwise arrangement in which one of the yarns is predominantly disposed on one surface of the textile material. In other words, one surface of the textile material is predominantly formed by one yarn type. Suitable patternwise arrangements or constructions that provide such a textile material include, but are not limited to, satin weaves, sateen weaves, and twill weaves in which, on a single surface of the fabric, the fill yarn floats and the warp yarn floats are of different lengths.

In a preferred embodiment, the textile material is a knit textile material. The knit textile material can be produced from a single plurality or type of yarn (e.g., the fabric can be formed solely from yarns comprising cellulosic fibers), or the knit textile material can be produced from two or more different types of yarns (e.g., the fabric can be formed from a first plurality of yarns comprising cellulosic fibers and a second plurality of yarns comprising synthetic filaments). In a knit fabric comprising two different types of yarns, the knit fabric can be constructed so that the two yarns run parallel through the fabric and together form the interlocking loops of the knit. Alternatively, the knit fabric can be constructed so that one of the yarns forms the interlocking loops of the knit and the other yarn is tucked into those loops at regular intervals in the knit. In this latter arrangement, the other yarn typically is tucked behind one loop in the knit and then skips over one or more adjacent loops in the same row before it is tucked behind another loop in the knit. This pattern will result in the tucked yarn being predominantly disposed on one surface of the textile material so that each surface of the textile material is predominantly formed by a different type yarn.

Preferably, the textile material comprises cellulosic fibers. As utilized herein, the term "cellulosic fibers" refers to fibers composed of, or derived from, cellulose. Examples of suitable cellulosic fibers include cotton, rayon, lyocell, linen, jute, hemp, cellulose acetate, and combinations, mixtures, or blends thereof. Preferably, the cellulosic fibers comprise cotton fibers.

In those embodiments of the textile material comprising cotton fibers, the cotton fibers can be of any suitable variety. Generally, there are two varieties of cotton fibers that are readily available for commercial use in North America: the Upland variety (*Gossypium hirsutum*) and the Pima variety (*Gossypium barbadense*). The cotton fibers used as the cellulosic fibers in the invention can be cotton fibers of either the Upland variety, the Pima variety, or a combination, mixture, or blend of the two. Generally, cotton fibers of the Upland variety, which comprise the majority of the cotton used in the apparel industry, have lengths ranging from about 0.875 inches to about 1.3 inches, while the less common fibers of the Pima variety have lengths ranging from about 1.2 inches to about 1.6 inches. In a preferred embodiment, at least some of the cotton fibers used in the textile material are of the Pima variety, which are preferred due to their greater, more uniform length.

In those embodiments in which the textile material comprises cellulosic fibers, the cellulosic fibers can be present in the textile material in any suitable amount. For example, in certain embodiments, the cellulosic fibers can comprise about 15% or more, about 20% or more, about 25% or more, about 30% or more, or about 35% or more, about 40% or more, about 45% or more, or about 50% or more, by weight, of the fibers present in the textile material. While the inclusion of cellulosic fibers can improve the comfort of the textile material (e.g., improve the hand and moisture absorbing characteristics), the exclusive use of cellulosic fibers can deleteriously affect the durability of the textile material. Accordingly, it may be desirable to use other fibers (e.g., synthetic fibers) in combination with the cellulosic fibers in order to achieve a desired level of durability. Thus, in such embodiments, the cellulosic fibers can comprise about 95% or less or about 90% or less, by weight, of the fibers present in the textile material. More specifically, in certain embodiments, the cellulosic fibers can comprise about 15% to about 95%, about 20% to about 95%, about 25% to about 95%, about 30% to about 95%, or about 30% to about 90%, by weight, of the fibers present in the textile material.

In certain embodiments of the invention, one or more of the yarns in the textile material can comprise thermoplastic synthetic fibers. For example, the yarn can comprise a blend of cellulosic fibers and thermoplastic synthetic fibers. These thermoplastic synthetic fibers typically are included in the textile material in order to increase its durability to, for example, industrial washing conditions. In particular, thermoplastic synthetic fibers tend to be rather durable to abrasion and harsh washing conditions employed in industrial laundry facilities and their inclusion in, for example, a cellulosic fiber-containing spun yarn can increase that yarns durability to such conditions. This increased durability of the yarn, in turn, leads to an increased durability for the textile material. Suitable thermoplastic synthetic fibers include, but are not necessarily limited to, polyester fibers (e.g., poly (ethylene terephthalate) fibers, poly(propylene terephthalate) fibers, poly(trimethylene terephthalate) fibers, poly (butylene terephthalate) fibers, and blends thereof), polyamide fibers (e.g., nylon 6 fibers, nylon 6,6 fibers, nylon 4,6 fibers, and nylon 12 fibers), polyvinyl alcohol fibers, and combinations, mixtures, or blends thereof.

In one preferred embodiment, the textile material comprises a plurality of yarns comprising a blend of cellulosic fibers and synthetic fibers (e.g., synthetic staple fibers). In this embodiment, the synthetic fibers can be any of those described above, with polyester fibers (e.g., polyester staple fibers) being particularly preferred. In such an embodiment, the cellulosic fibers comprise about 30% to about 90% (e.g., about 40% to about 90%, about 50% to about 90%, or about 70% to about 90%), by weight, of the fibers present in the yarn, and the polyester fibers comprise about 10% to about 50% (e.g., about 10% to about 40%, about 10% to about 35%, about 10% to about 30%), by weight, of the fibers present in the yarn.

In certain embodiments of the invention, one plurality of yarns in the textile material can comprise cellulosic fibers and one plurality of yarns in the textile material can be filament yarns comprising thermoplastic synthetic filaments. These filament yarns can provide the same benefits described above for the thermoplastic synthetic fibers. Suitable thermoplastic synthetic filaments for use in such filament yarns include, but are not limited to, polyester filaments (e.g., poly(ethylene terephthalate) filaments, poly (propylene terephthalate) filaments, poly(trimethylene terephthalate) filaments, poly(butylene terephthalate) filaments, and blends thereof), polyamide filaments (e.g., nylon 6 filaments, nylon 6,6 filaments, nylon 4,6 filaments, and nylon 12 filaments), polyvinyl alcohol filaments, and combinations, mixtures, or blends thereof.

In those embodiments in which the textile material comprises thermoplastic synthetic fibers or filaments, the thermoplastic synthetic fibers or filaments can be present in the textile material in any suitable amount. For example, in certain embodiments, the thermoplastic synthetic fibers or filaments can comprise about 1% or more, about 2.5% or more, about 5% or more, about 7.5% or more, or about 10% or more, by weight, of the fibers present in the textile material. The thermoplastic synthetic fibers or filaments can comprise about 40% or less, about 35% or less, about 30% or less, about 25% or less, about 20% or less, or about 15% or less, by weight, of the fibers present in the textile material. More specifically, in certain embodiments, the thermoplastic synthetic fibers or filaments can comprise about 1% to about 40%, about 2.5% to about 35%, about 5% to about 30% (e.g., about 5% to about 25%, about 5% to about 20%, or about 5% to about 15%), or about 7.5% to about 25% (e.g., about 7.5% to about 20%, or about 7.5% to about 15%), by weight, of the fibers present in the textile material.

In one particularly preferred embodiment, the textile material comprises a first plurality of yarns comprising cellulosic fibers and a second plurality of filament yarns comprising thermoplastic synthetic filaments. In this embodiment, the filament yarns can comprise any of the synthetic filaments described above, with polyester filaments being particularly preferred. In such an embodiment, the cellulosic fibers can comprise about 30% to about 90% (e.g., about 40% to about 90%, about 50% to about 90%, or about 70% to about 90), by weight, of the fibers present in the textile material, and the filament yarns can comprise about 10% to about 50% (e.g., about 10% to about 40%, about 10% to about 35%, about 10% to about 30%), by weight, of the fibers present in the textile material.

In certain embodiments, the textile material of the invention can contain yarns comprising inherent flame resistant fibers. As utilized herein, the term "inherent flame resistant fibers" refers to synthetic fibers which, due to the chemical composition of the material from which they are made, exhibit flame resistance without the need for an additional flame retardant treatment. In such embodiments, the inherent flame resistant fibers can be any suitable inherent flame resistant fibers, such as polyoxadiazole fibers, polysulfonamide fibers, poly(benzimidazole) fibers, poly(phenylenesulfide) fibers, meta-aramid fibers, para-aramid fibers, polypyridobisimidazole fibers, polybenzylthiazole fibers, polybenzyloxazole fibers, melamine-formaldehyde polymer fibers, phenol-formaldehyde polymer fibers, oxidized polyacrylonitrile fibers, polyamide-imide fibers and combinations, mixtures, or blends thereof. In certain embodiments, the inherent flame resistant fibers are preferably selected from the group consisting of polyoxadiazole fibers, polysulfonamide fibers, poly(benzimidazole) fibers, poly(phenylenesulfide) fibers, meta-aramid fibers, para-aramid fibers, and combinations, mixtures, or blends thereof.

The inherent flame resistant fibers can be present in one of the pluralities or types of yarn used in making the textile material in any suitable amount. In those embodiments in which the textile material comprises a yarn containing a blend of cellulosic fibers and inherent flame resistant fibers, the inherent flame resistant fibers can comprise about 1% or more or about 5% or more, by weight, of the fibers present in the yarn. Thus, in such embodiments, the inherent flame resistant fibers can comprise about 5% to about 15% or about 5% to about 10%, by weight, of the fibers present in the yarn.

The inherent flame resistant fibers can be present in the textile material in any suitable amount. Generally, the amount of inherent flame resistant fibers included in the textile material will depend upon the desired properties of the final textile material. In certain embodiments, the inherent flame resistant fibers can comprise about 1% or more, about 2% or more, about 3% or more, about 4% or more, about 5% or more, by weight, of the fibers present in the textile material. In certain embodiments, the inherent flame resistant fibers can comprise about 20% or less, about 15% or less, or about 10% or less, by weight, of the fibers present in the textile material. Thus, in certain embodiments, the inherent flame resistant fibers can comprise about 1% to about 20%, about 2% to about 15%, about 3% to about 10%, about 4% to about 10, or about 5% to about 10%, by weight, of the fibers present in the textile material.

The textile material can have any suitable weight per unit area. Preferably, the textile material has a weight of about 4 oz/yd$^2$ (about 135 g/m$^2$) or more. The weight of the textile material preferably remains relatively low so that the material remains comfortable to wear. Preferably, the textile material has a weight of about 10 oz/yd$^2$ (about 340 g/m$^2$) or less, about 9 oz/yd$^2$ (about 305 g/m$^2$) or less, about 8 oz/yd$^2$ (about 270 g/m$^2$) or less, about 7 oz/yd$^2$ (about 240 g/m$^2$) or less, or about 6 oz/yd$^2$ (about 200 g/m$^2$) or less. Thus, in a series of preferred embodiments, the textile material has a weight of about 4 to about 10 oz/yd$^2$ (about 135 to about 340 g/m$^2$), about 4 to about 9 oz/yd$^2$ (about 135 to about 305 g/m$^2$), about 4 to about 8 oz/yd$^2$ (about 135 to about 270 g/m$^2$), about 4 to about 7 oz/yd$^2$ (about 135 to about 240 g/m$^2$), or about 4 to about 6 oz/yd$^2$ (about 135 to about 200 g/m$^2$). The foregoing weights can apply to either the untreated textile material (i.e., the textile material before the application of the flame retardant, phosphorus-containing polymer) or the article of the invention (i.e., the textile material having the flame retardant, phosphorus-containing polymer on the surface of a portion of its fibers, as described below).

As noted above, the article further comprises a flame retardant, phosphorus-containing polymer. The polymer is disposed on at least a portion of the surface of at least a portion of the textile fibers in the textile material. The polymer typically is present in the form of a coating on the surface of the textile fibers. At least a portion of the flame retardant, phosphorus-containing polymer is present in the form of a plurality of microprotuberances protruding from the surface of the textile fibers. As used herein, the term "microprotuberance" refers to micron- or sub-micron-sized structures that have a substantially spherical or substantially spherical cap shape (e.g., a hemispherical shape). As used in this definition, the term "spherical cap" refers a portion of a sphere cut off by a plane. The microprotuberances can be present on the surface of the textile fibers in the form of individual microprotuberances or two or more individual microprotuberances can be agglomerated to form larger agglomerates.

The microprotuberances can be any suitable size. The microprotuberances preferably have a diameter (as measured through the longest dimension of the individual microprotuberance) of about 50 nm or more, about 100 nm or more, about 150 nm or more, or about 200 nm or more. The microprotuberances preferably have a diameter of about 10 microns or less, about 7.5 microns or less, about 5 microns or less, or about 4 microns or less. Thus, in a preferred embodiment, the microprotuberances have a diameter of about 50 nm to about 10 microns, about 100 nm to about 7.5 microns, about 100 nm to about 5 microns, or about 150 nm to about 5 microns (e.g., about 150 nm to about 4 microns), or about 200 nm to about 4 microns. The individual microprotuberances can also be agglomerated, and the resulting agglomerates preferably have a diameter (as measured through the longest dimension of the agglomerate) of about 100 microns or less, about 75 microns or less, about 50 microns or less, about 40 microns or less, about 30 microns or less, about 25 microns or less, or about 20 microns or less.

Figure 2:
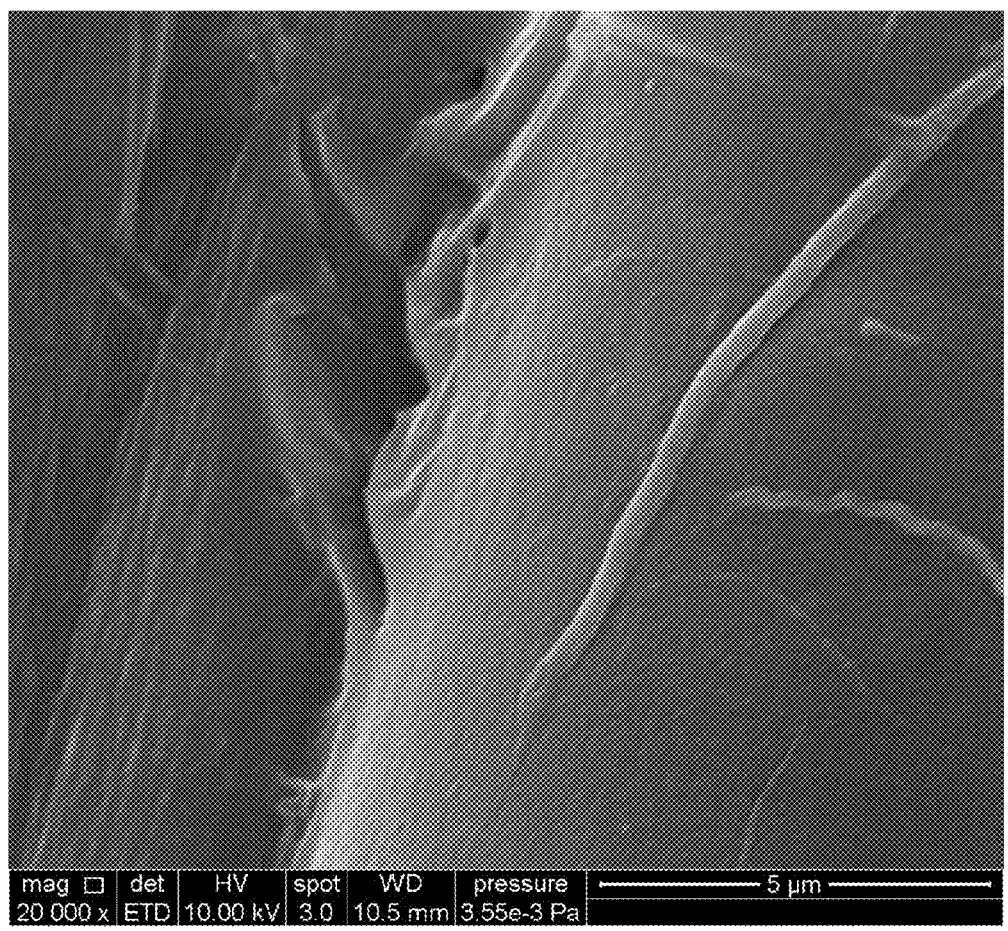
FIG. 2 is an SEM image (20,000 times magnification) of the surface of textile fibers in the fabric shown in FIG. 1.
Figure 3:
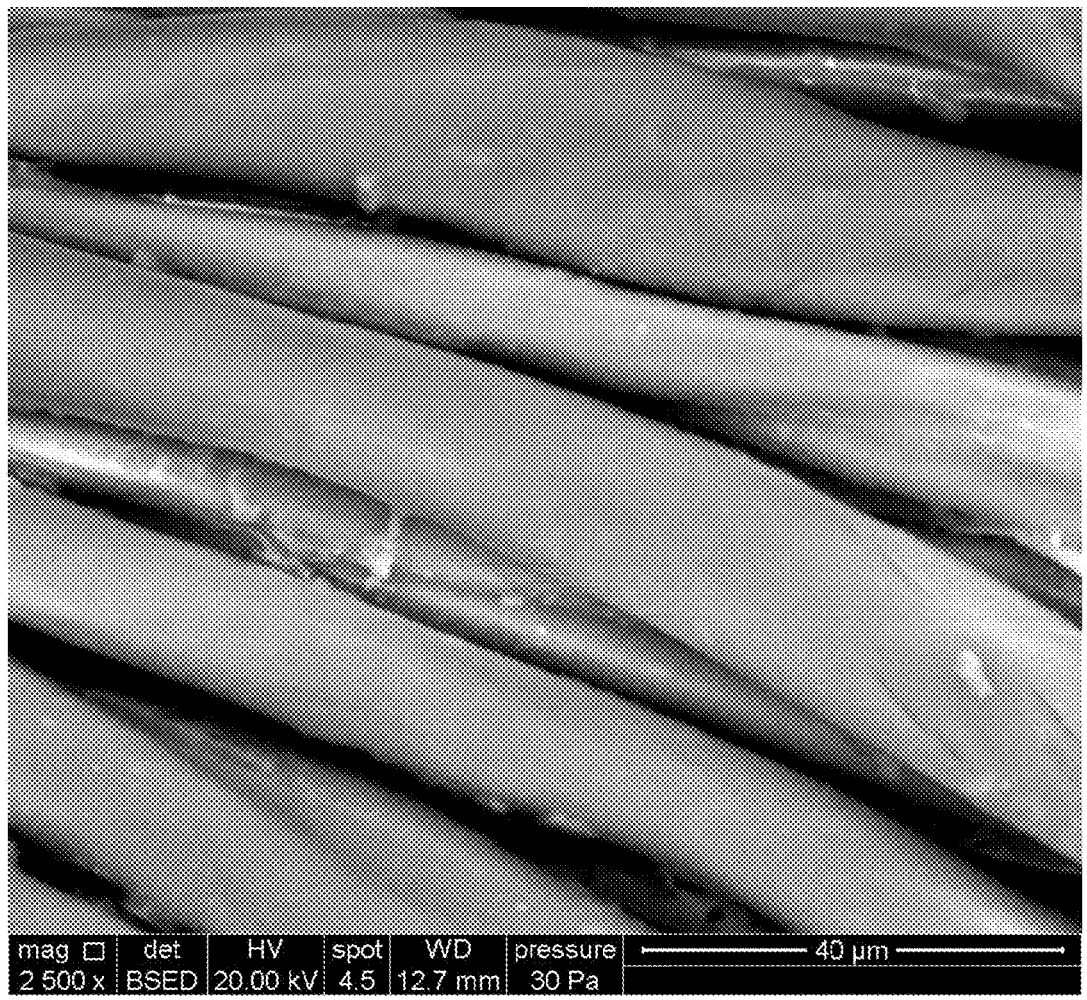
FIG. 3 is an SEM image (2,500 times magnification) of the surface of textile fibers in a commercially-available fabric treated with a flame retardant, phosphorus-containing.
Figure 4:
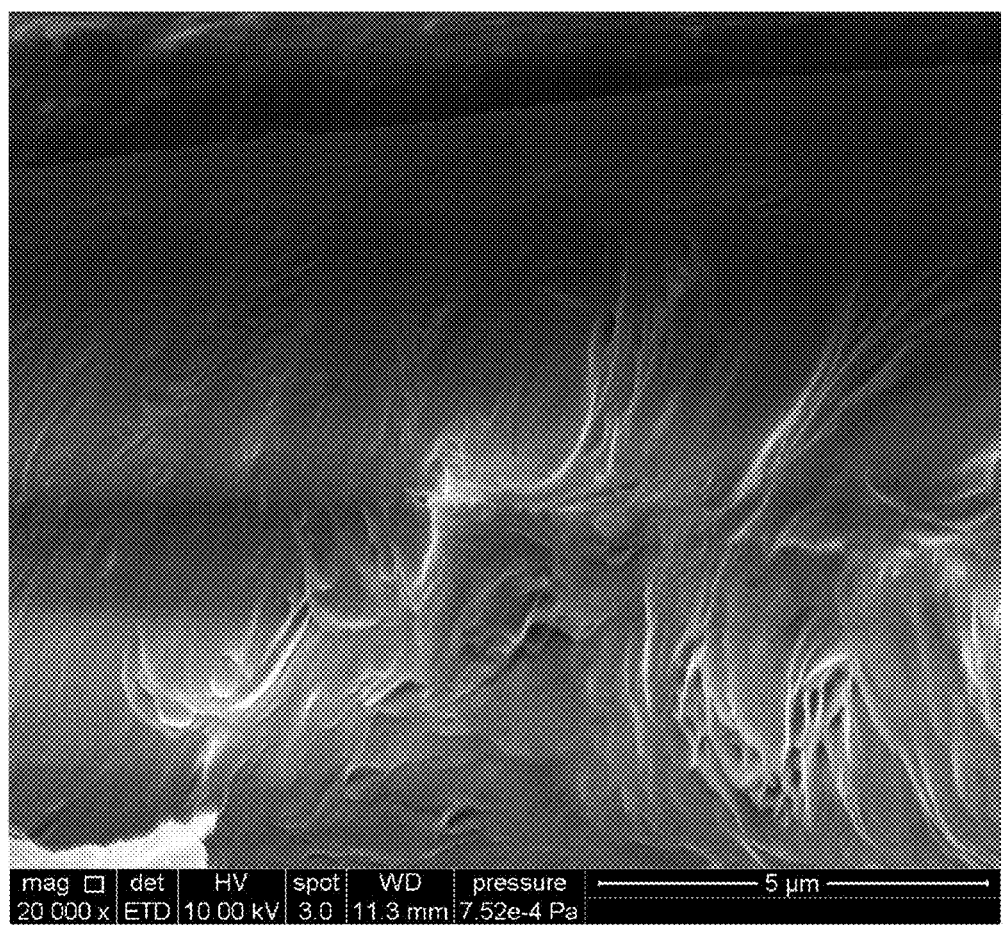
FIG. 4 is an SEM image (20,000 times magnification) of the surface of textile fibers in the fabric shown in FIG. 3.
Figure 5:
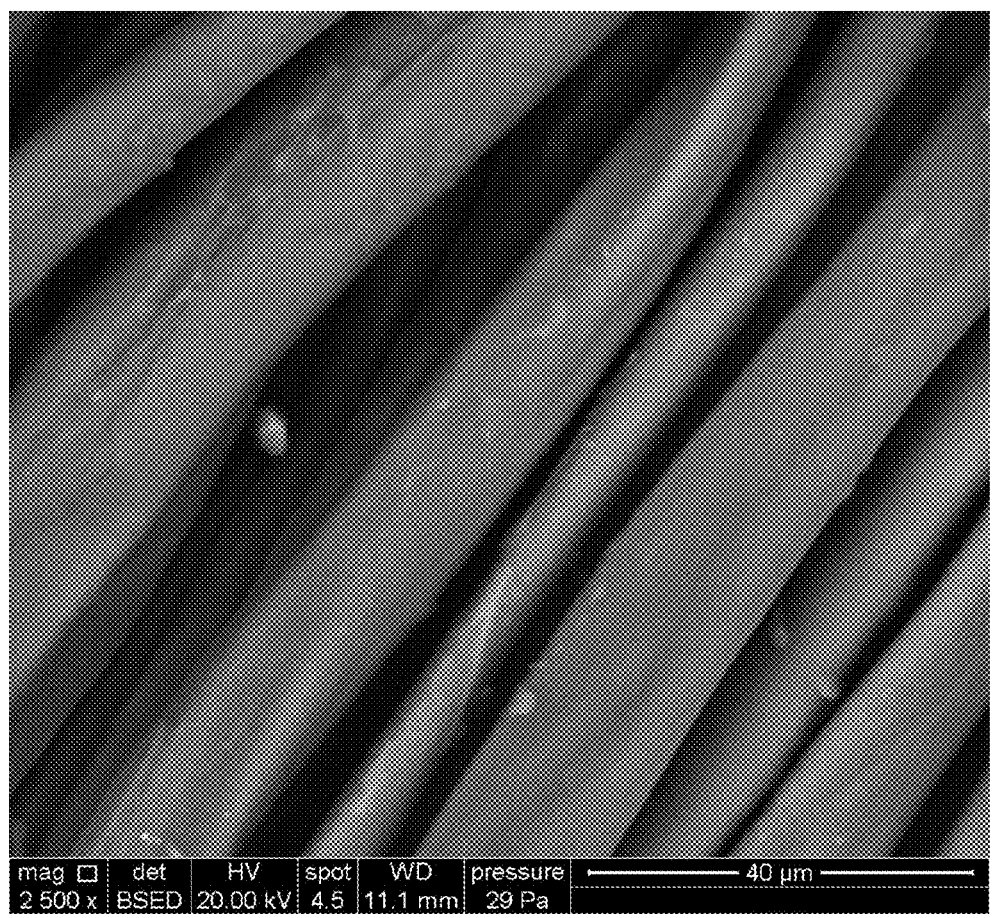
FIG. 5 is an SEM image (2,500 times magnification) of the surface of textile fibers in a commercially-available fabric treated with a flame retardant, phosphorus-containing.
Figure 6:
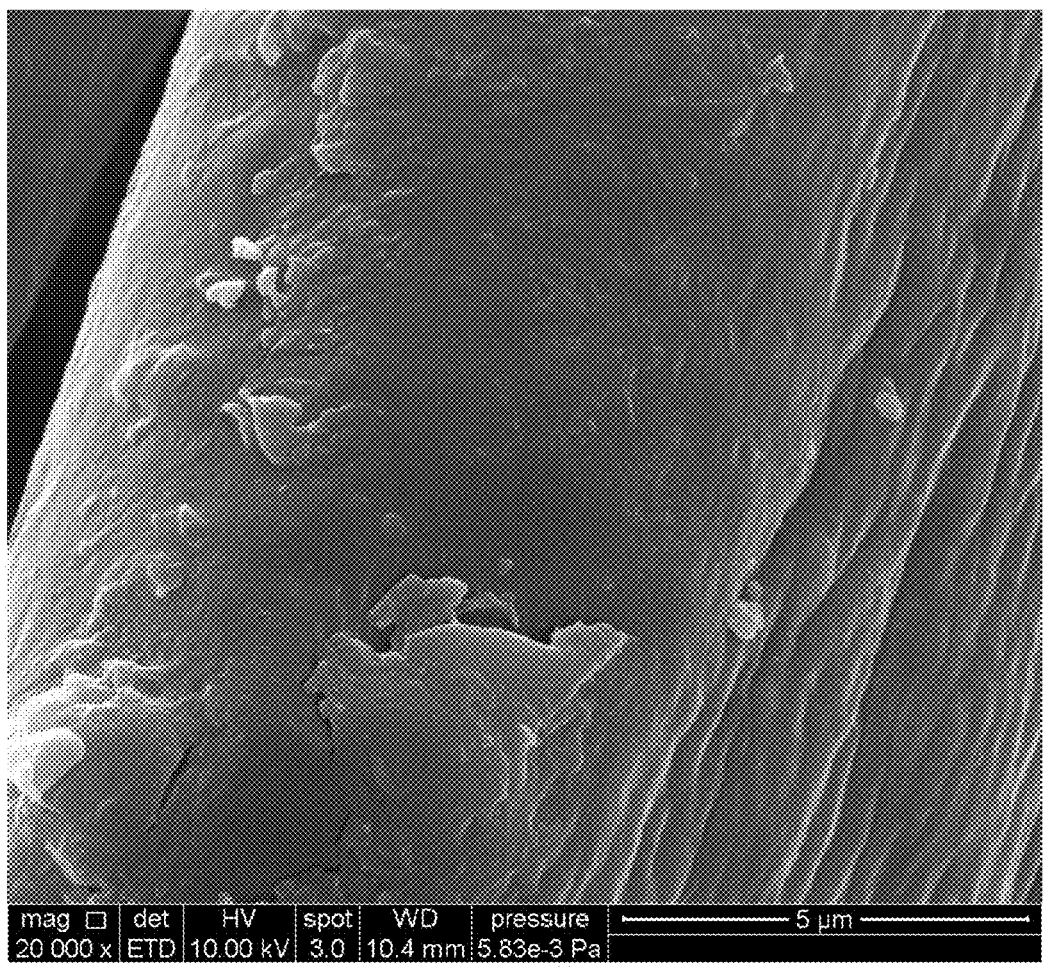
FIG. 6 is an SEM image (20,000 times magnification) of the surface of textile fibers in the fabric shown in FIG. 5.
Figure 7:
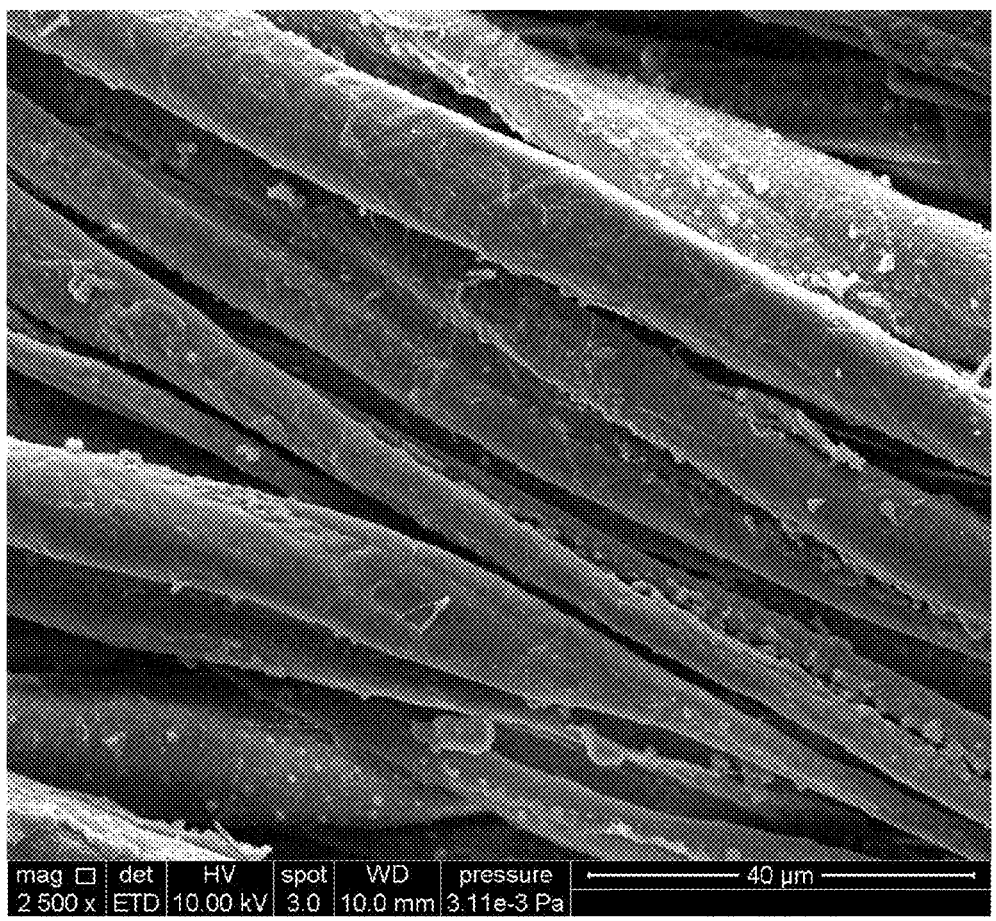
FIG. 7 is an SEM image (2,500 times magnification) of the surface of textile fibers in a textile material prepared in accordance with the invention.
Figure 8:
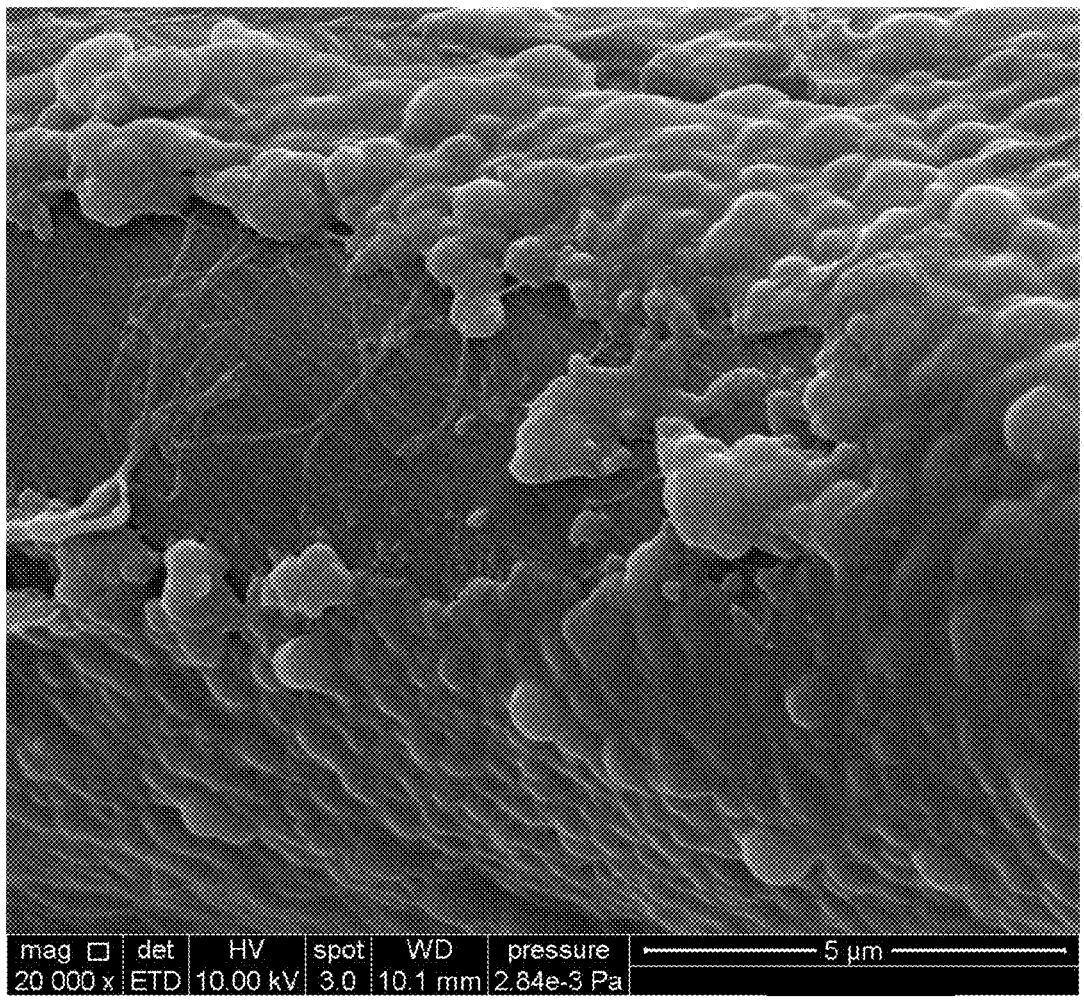
FIG. 8 is an SEM image (20,000 times magnification) of the surface of textile fibers in the textile material shown in FIG. 7.
Figure 9:
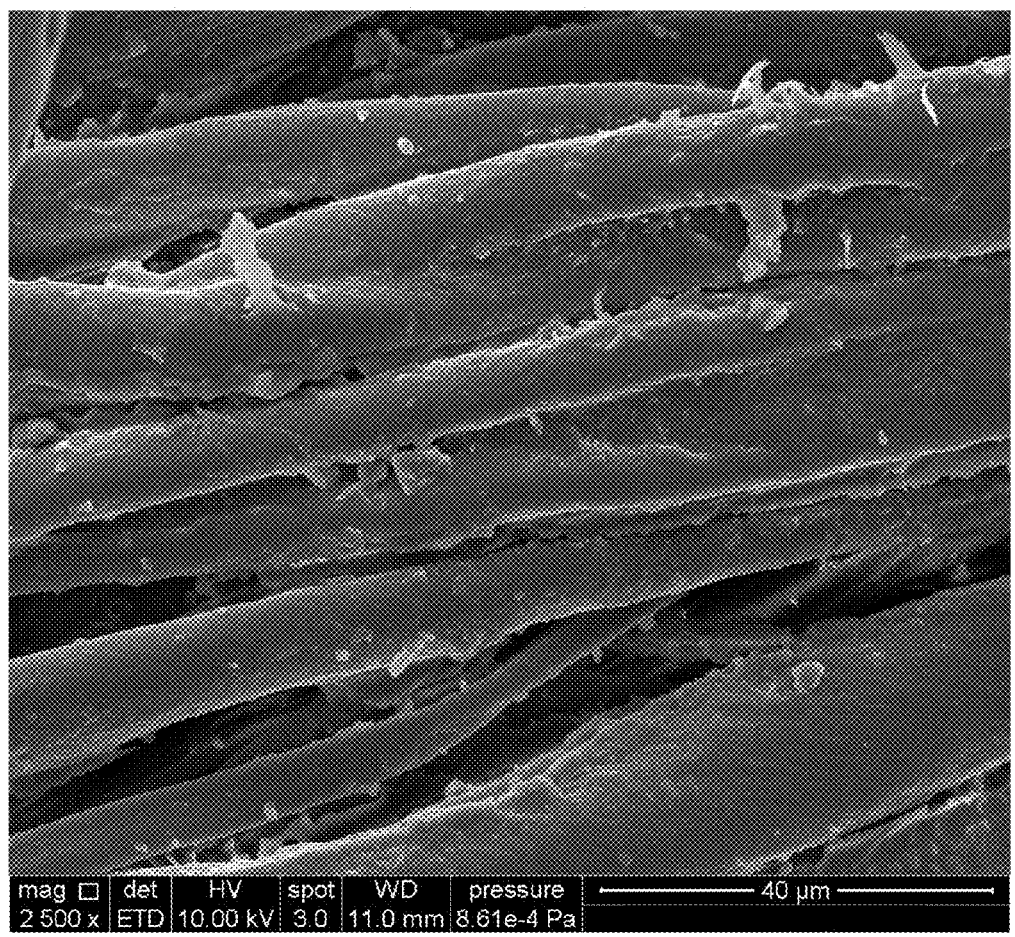
FIG. 9 is an SEM image (2,500 times magnification) of the surface of textile fibers in a textile material prepared in accordance with the invention.
Figure 10:
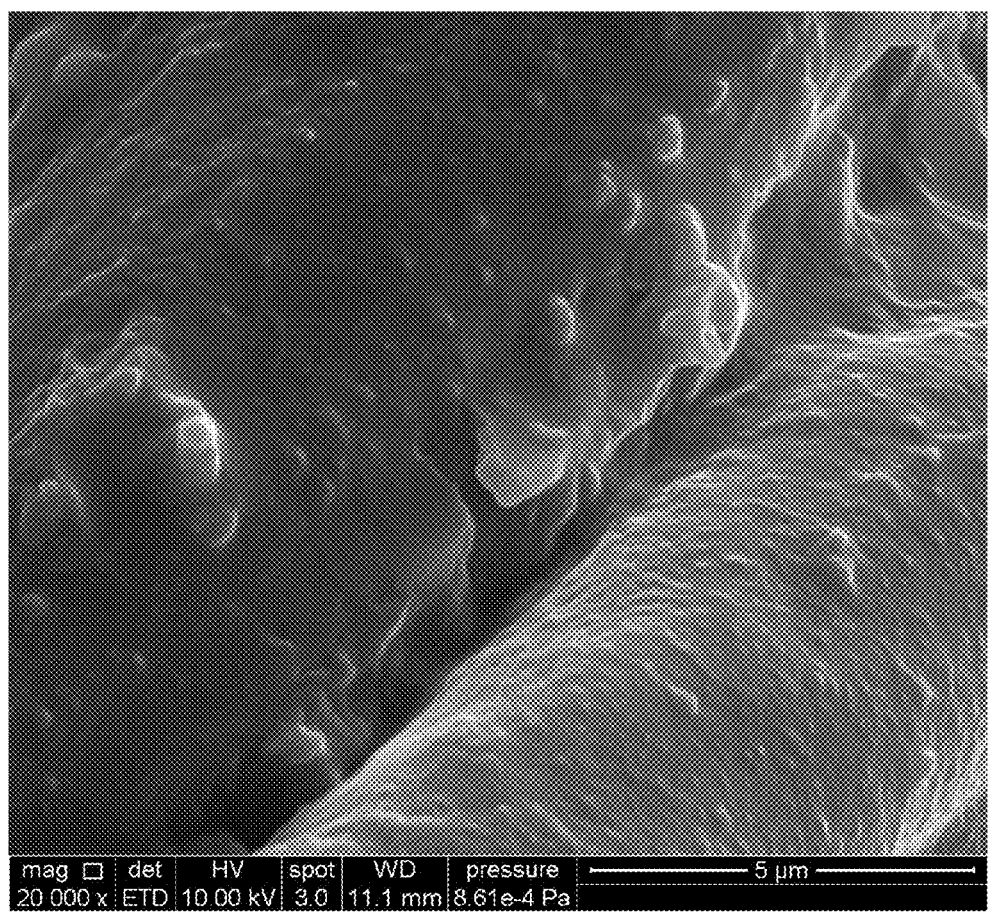
FIG. 10 is an SEM image (20,000 times magnification) of the surface of textile fibers in the textile material shown in FIG. 9.

The presence of these microprotuberances on the surface of the textile fibers is unique as compared to conventional flame retardant coatings applied to textile materials. As can be seen from FIGS. 1-6, textile materials treated with conventional flame retardant coatings have surfaces that are substantially uniform having a relatively low number of irregular surface features. While not wishing to be bound to any particular theory, it is believed that this substantially uniform surface is the result of the process used to apply convention flame retardant coatings to textile materials. This process typically involves dipping the textile material in a bath of the flame retardant material, which produces a thin, uniform film of the material on the surface of the textile material, and then curing the flame retardant material. The result is a substantially uniform surface coating on the surface of the textile material. By way of contrast, as can be seen from FIGS. 7-10, the article of the invention comprises a plurality of microprotuberances protruding from the surfaces of the textile fibers. As shown in FIGS. 7-10, these microprotuberances are micron- or sub-micron-sized structures that have a substantially spherical or substantially spherical cap (e.g., hemispherical) shape.

The flame retardant, phosphorus-containing polymer comprises a plurality of phosphorus atoms. Most of these phosphorus atoms are present in the "backbone" of the polymer, meaning that the phosphorus atoms are joined together by intervening linking moieties. This is in contrast to some phosphorus-containing polymers in which the phosphorus atoms are contained in pendant groups that are attached to the polymer backbone.

The phosphorus atoms are present in the polymer in phosphorus-containing moieties. As noted above, these phosphorus-containing moieties are bonded to adjacent phosphorus-containing moieties, thereby forming the backbone of the polymer chain. In these moieties, the phosphorus atoms can be present in different oxidation states, which yield different phosphorus-containing moieties. In particular, it is believed that within the polymer the phosphorus atoms can exist in one of two oxidation states: phosphorus (III) or phosphorus (V). The phosphorus atoms in the phosphorus (III) oxidation state can be present in phosphine moieties or phosphonium moieties; and the phosphorus atoms in the phosphorus (V) oxidation state are present in phosphine oxide moieties.

Preferably, at least a portion of the phosphorus atoms are present in the phosphorus-containing polymer in phosphine oxide moieties conforming to a structure selected from the group consisting of Formula (X), Formula (XI), and Formula (XII)

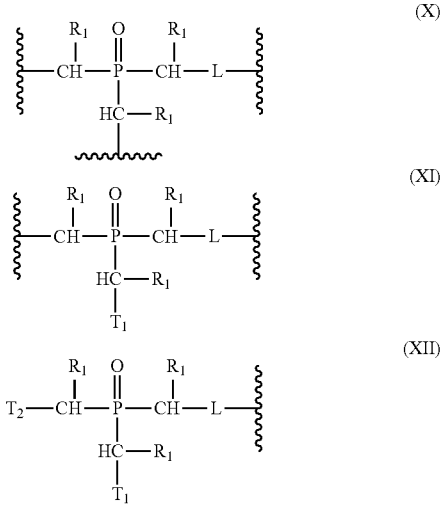

wherein, in each structure, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; $T_1$ and $T_2$ are independently selected from the group consisting of a hydroxy group and univalent moieties comprising at least one nitrogen atom; and L is a polyvalent linking group comprising at least one nitrogen atom. As used herein, the term "polyvalent" in reference to the linking group L means that the linking group has two or more bonds to adjacent moieties. Thus, even though the structures set forth in the application only show two bonds emanating from the linking group, it is possible for the linking group to be bonded to more than two adjacent moieties. In the structure of Formula (X), Formula (XI), Formula (XII), and the structures that follow, the partial bonds (i.e., the bonds truncated by the wavy line) represent bonds through linking groups to adjacent moieties.

In a preferred embodiment, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In a preferred embodiment, $R_1$ is hydrogen.

In another preferred embodiment, $T_1$ and $T_2$ are independently selected from the group consisting of a hydroxy group and univalent moieties comprising at least one nitrogen atom that are produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. Given the manner in which the polymer is produced (which is described in detail below), the structure of the T can vary from phosphine oxide moiety to phosphine oxide moiety. This can occur if only a portion of the terminal hydroxy groups on the phosphonium compound react with the cross-linking compound, which would yield a polymer containing a mixture of terminal hydroxy groups and terminal nitrogen moieties. This can also occur if a mixture of different cross-linking compounds is used to produce the polymer. Preferably, $T_1$ and $T_2$ are independently selected from the group consisting of a hydroxy group and moieties produced by a reaction with a compound selected from the group consisting of ammonia, urea, alkylene urea compounds, melamine, guanidine, guanidine derivatives, dicyandiamide, and mixtures thereof.

In another preferred embodiment, each L is a linking group produced by a reaction with a compound selected from the group consisting of urea, a guanidine (i.e., guanidine, a salt thereof, or a guanidine derivative), guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. Given the manner in which the polymer is produced (which is described in detail below), the structure of the linking group (L) can vary from phosphine oxide moiety to phosphine oxide moiety. This can occur if a mixture of different cross-linking compounds is used to produce the polymer. Preferably, L is a linking group produced by a reaction with a compound selected from the group consisting of ammonia, urea, alkylene urea compounds, melamine, guanidine, guanidine derivatives, dicyandiamide, and mixtures thereof.

In a preferred embodiment, about 50% or more of the phosphorus atoms in the phosphorus-containing polymer are present in phosphine oxide moieties conforming to a structure selected from the group consisting of Formula (X), Formula (XI), and Formula (XII). More preferably, about 60% or more of the phosphorus atoms in the phosphorus-containing polymer are present in phosphine oxide moieties conforming to a structure selected from the group consisting of Formula (X), Formula (XI), and Formula (XII). Most preferably, about 65% or more of the phosphorus atoms in the phosphorus-containing polymer are present in phosphine oxide moieties conforming to a structure selected from the group consisting of Formula (X), Formula (XI), and Formula (XII).

As noted above, the remaining phosphorus atoms in the phosphorus-containing polymer preferably are present in moieties selected from the group consisting of phosphine moieties and phosphonium moieties. The phosphine moieties preferably conform to a structure selected from the group consisting of Formula (XV), Formula (XVI), and Formula (XVII)

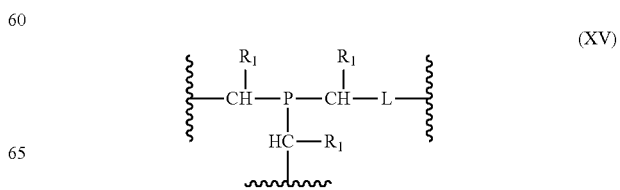

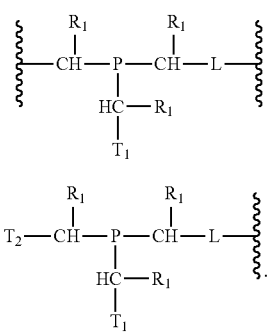

(XVI)

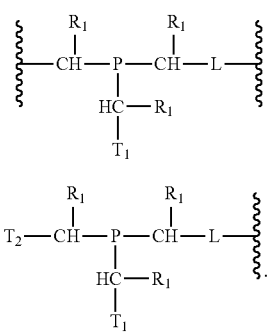

(XVII)

In the structures of Formula (XV), Formula (XVI), and Formula (XVII), $R_1$ can be any suitable group, such as an alkyl group, a haloalkyl group, an alkenyl group, or a haloalkenyl group; $T_1$ and $T_2$ are independently selected from the group consisting of a hydroxy group and univalent moieties comprising at least one nitrogen atom; and L is a polyvalent linking group comprising at least one nitrogen atom. In a preferred embodiment, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In a preferred embodiment, $R_1$ is hydrogen. In another preferred embodiment, $T_1$ and $T_2$ are independently selected from the group consisting of a hydroxy group and univalent moieties comprising at least one nitrogen atom that are produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. As with the structures of Formula (X), Formula (XI), and Formula (XII), the structure of T can vary from phosphine moiety to phosphine moiety. Preferably, $T_1$ and $T_2$ are independently selected from the group consisting of a hydroxy group and moieties produced by a reaction with a compound selected from the group consisting of ammonia, urea, alkylene urea compounds, melamine, guanidine, guanidine derivatives, dicyandiamide, and mixtures thereof. In another preferred embodiment, each L is a polyvalent linking group produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. As with the structures of Formula (X), Formula (XI), and Formula (XII), the structure of the linking group (L) can vary from phosphine moiety to phosphine moiety. Preferably, L is a polyvalent linking group produced by a reaction with a compound selected from the group consisting of ammonia, urea, alkylene urea compounds, melamine, guanidine, guanidine derivatives, dicyandiamide, and mixtures thereof.

The phosphonium moieties preferably conform to a structure selected from the group consisting of Formula (XX), Formula (XXI), Formula (XXII), and Formula (XXIII)

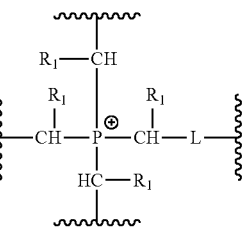

(XX)

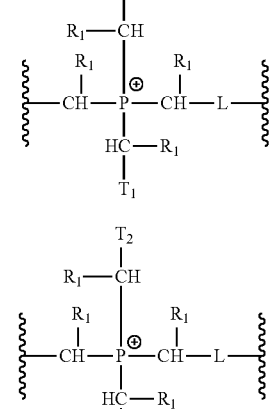

(XXI)

(XXII)

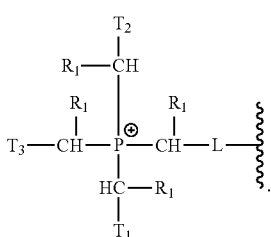

(XXIII)

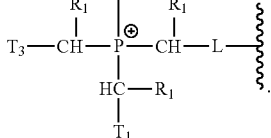

In the structures of Formula (XX), Formula (XXI), Formula (XXII), and Formula (XXIII), $R_1$ can be any suitable group, such as an alkyl group, a haloalkyl group, an alkenyl group, or a haloalkenyl group; $T_1$, $T_2$, and $T_3$ are independently selected from the group consisting of a hydroxy group and univalent moieties comprising at least one nitrogen atom; and L is a polyvalent linking group comprising at least one nitrogen atom. In a preferred embodiment, $R_1$ is independently selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In a preferred embodiment, $R_1$ is hydrogen. In another preferred embodiment, $T_1$, $T_2$, and $T_3$ are independently selected from the group consisting of a hydroxy group and univalent moieties comprising at least one nitrogen atom that are produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. As with the structures of Formula (X), Formula (XI), and Formula (XII), the structure of T can vary from phosphonium moiety to phosphonium moiety. Preferably, $T_1$, $T_2$, and $T_3$ are independently selected from the group consisting of a hydroxy group and moieties produced by a reaction with a compound selected from the group consisting of ammonia, urea, alkylene urea compounds, melamine, guanidine, guanidine derivatives, dicyandiamide, and mixtures thereof. In another preferred embodiment, each L is a polyvalent linking group produced by a reaction with a compound selected from the group consisting of urea, an alkylene urea, a guanidine (i.e., guanidine, a salt thereof, or a guanidine derivative), melamine, a melamine derivative, guanamine, guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. As with the structures of Formula (X), Formula (XI), and Formula (XII), the structure of the linking group (L) can vary from phosphonium moiety to phosphonium moiety. Preferably, L is a polyvalent linking group produced by a reaction with a compound selected from the group consisting of ammonia, urea, alkylene urea compounds, melamine, guanidine, guanidine derivatives, dicyandiamide, and mixtures thereof.

The phosphonium moieties conforming to a structure selected from the group consisting of Formula (XX), Formula (XXI), Formula (XXII), and Formula (XXIII) can have any suitable counterion. Suitable counterions include, but are not limited to, halides (e.g., chloride), sulfate, hydrogen sulfate, phosphate, acetate, carbonate, bicarbonate, borate, and hydroxide.

The article of the invention can comprise any suitable amount of the flame retardant, phosphorus-containing polymer. In a preferred embodiment, the phosphorus-containing polymer is present in the article in an amount that provides about 0.5% or more, about 1% or more, about 1.5% or more, about 2% or more, about 2.5% or more, or about 3% or more of elemental phosphorus based on the weight of the untreated textile material. In another preferred embodiment, the phosphorus-containing polymer is present in the article in an amount that provides about 10% or less, about 7.5% or less, about 5% or less, about 4.5% or less, about 4% or less, about 3.5% or less, or about 3% or less of elemental phosphorus based on the weight of the untreated textile material. Preferably, the phosphorus-containing polymer is present in the article in an amount that provides about 1% to about 4%, about 1% to about 3%, or about 1.5% to about 3% of elemental phosphorus based on the weight of the untreated textile material.

In a second embodiment, the invention provides an article comprising a textile material and a flame retardant, phosphorus-containing polymer disposed on at least a portion of the surface of at least a portion of the textile fibers in the textile material. The textile material in this second embodiment can be any of the textile materials described above in connection with the first embodiment of the invention.

The flame retardant, phosphorus-containing polymer in this second embodiment is produced by a process comprising the steps of:

(1) providing a phosphonium compound comprising at least one phosphonium moiety, the phosphonium moiety conforming to the structure of Formula (I)

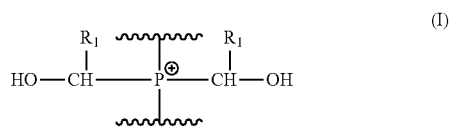

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl;

(2) providing a nitrogen-containing cross-linking compound, the nitrogen-containing cross-linking compound comprising two or more nitrogen-hydrogen bonds;

(3) reacting the phosphonium compound and the nitrogen-containing cross-linking compound in a condensation reaction to produce a first intermediate polymer, the first intermediate polymer comprising a plurality of phosphorus atoms; and (4) oxidizing the first intermediate polymer to convert at least a portion of the phosphorus atoms in the first intermediate polymer to a pentavalent, phosphine oxide state, thereby producing a flame-retardant, phosphorus-containing polymer comprising a plurality of phosphorus atoms having functional groups attached thereto.

The phosphonium compound, the nitrogen-containing cross-linking compound, and oxidizing agent used in the above-described process can be any of the compounds described below in connection with the process embodiment of the invention. Also, the flame retardant, phosphorus-containing polymer can possess all of the features of the polymer described above in connection with the polymer present in the first article embodiment of the invention.

The flame retardant, phosphorus-containing polymers present in both the first article embodiment and the second article embodiment of the invention preferably contain a relatively low amount of hydroxyalkyl groups as compared to conventional flame retardant, phosphorus-containing polymers. Preferably, 15% or less of the functional groups attached to the phosphorus atoms in the flame retardant, phosphorus-containing polymer are hydroxyalkyl groups. More preferably, 10% or less of the functional groups attached to the phosphorus atoms in the flame retardant, phosphorus-containing polymer are hydroxyalkyl groups. And most preferably, about 5% or less of the functional groups attached to the phosphorus atoms in the flame retardant, phosphorus-containing polymer are hydroxyalkyl groups.

As explained in other portions of this application, the articles of the invention are believed to be particularly well suited for use in making personal protective equipment intended for use by individuals at risk for exposure to fire and/or electrical arc flashes. The articles of the invention can exhibit any suitable Arc Thermal Protective Value (ATPV), which is a measure of the electrical arc flash protection provided by an article. Preferably, the articles of the invention exhibit an ATPV of about 4 cal/cm$^2$ (17 J/cm$^2$) or more. More preferably, the articles of the invention exhibit an ATPV of about 8 cal/cm$^2$ (33 J/cm$^2$) or more, about 9 cal/cm$^2$ (38 J/cm$^2$) or more, or about 10 cal/cm$^2$ (42 J/cm$^2$) or more.

The article of the invention can be made by any suitable process. However, in another embodiment, the invention provides a process for producing the article in the form of a treated textile material. The process comprises the steps of: (a) providing a textile material, the textile material comprising a plurality of textile fibers, each of the textile fibers having a surface; (b) providing a treatment composition; (c) placing the treatment composition in a reservoir where the treatment composition is heated to a temperature sufficient for the phosphonium compound and the nitrogen-containing cross-linking compound to begin to react in a condensation reaction to produce a phosphorus-containing polymer; (d) circulating the treatment composition from the reservoir through a passage to produce a circulating flow of the treatment composition; (e) passing the textile material through the circulating flow of treatment composition so that the textile material is entrained in the flow and circulated through the treatment composition in the reservoir; and (f) allowing the textile material to circulate through the reservoir for an amount of time sufficient for the phosphorus-containing polymer to deposit on at least a portion of the surface of at least a portion of the textile fibers, thereby producing a treated textile material. The textile material used in the above-described process can be any suitable textile material, including any embodiment of the textile material described above in connection with the article of the invention.

The treatment composition used in the process comprises a phosphonium compound and a nitrogen-containing cross-linking compound. The treatment composition typically comprises an aqueous medium in which the phosphonium compound and the nitrogen-containing cross-linking compound are dissolved or dispersed. The phosphonium compound used in the process preferably comprises a phosphonium moiety conforming to the structure of Formula (I)

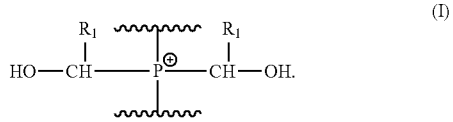

(I)

In the structure of Formula (I), $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In the structure of Formula (I), the partial bonds (i.e., the bonds truncated by the wavy line) represent bonds to other groups or moieties. For example, these other groups or moieties can be hydroxyalkyl groups having a similar structure to those depicted in Formula (I), or they can be moieties comprised of a linking group bonded to another phosphonium moiety having a similar structure.

Thus, in certain embodiments, the phosphonium compound can be a phosphonium salt conforming to the structure of Formula (II)

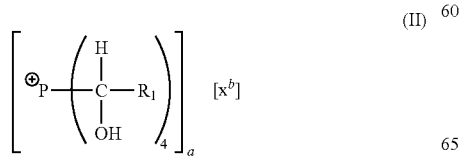

(II)

In the structure of Formula (II), $R_1$ can be any suitable group, such as an alkyl group, a haloalkyl group, an alkenyl group, or a haloalkenyl group. In a preferred embodiment, $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In another preferred embodiment, $R_1$ can be hydrogen. In the structure of Formula (II), X represents an anion and can be any suitable monatomic or polyatomic anion. In a preferred embodiment, X can be an anion selected from the group consisting of halides (e.g., chloride), sulfate, hydrogen sulfate, phosphate, acetate, carbonate, bicarbonate, borate, and hydroxide. In another preferred embodiment, X is a sulfate anion. In the structure of Formula (II), b represents the charge of the anion X. Therefore, in order to provide a phosphonium compound that is charge neutral, the number of phosphonium cations present in the compound is equal to (−b). Examples of such phosphonium compounds that are suitable for use in the process of the invention include, but are not limited to, tetrahydroxymethyl phosphonium salts, such as tetrahydroxymethyl phosphonium chloride, tetrahydroxymethyl phosphonium sulfate, tetrahydroxymethyl phosphonium acetate, tetrahydroxymethyl phosphonium carbonate, tetrahydroxymethyl phosphonium borate, and tetrahydroxymethyl phosphonium phosphate.

The phosphonium compound used in the process can also be a "precondensate," which is a phosphonium compound made by reacting a phosphonium salt with a suitable cross-linking agent. Phosphonium salts suitable for use in making such precondensates include, but are not limited to, the phosphonium salt compound conforming to the structure of Formula (II) above. Cross-linking agents suitable for making such precondensates include, but are not limited to, urea, a guanidine (i.e., guanidine, a salt thereof, or a guanidine derivative), guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. Phosphonium condensates suitable for use in generating the polymer of the invention are well known in the art. Examples of such precondensates are described, for example, in U.S. Pat. No. 7,713,891 (Li et al.); U.S. Pat. No. 8,012,890 (Li et al.); and U.S. Pat. No. 8,012,891 (Li et al.). The synthesis of such condensates is also described, for example, in Frank et al. (*Textile Research Journal*, November 1982, pages 678-693) and Frank et al. (*Textile Research Journal*, December 1982, pages 738-750). Some of these precondensates are also commercially available, for example, as PYROSAN® CFR from Emerald Performance Materials.

In one possible embodiment, the phosphonium compound can be a precondensate made by reacting a phosphonium salt, such as that described above, with melamine or a melamine derivative. Preferably, the melamine compound conforms to the structure of Formula (III)

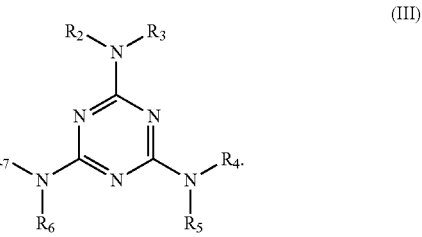

(III)

In the structure of Formula (III), $R_2$, $R_3$, $R_4$, $R_5$, $R_6$, and $R_7$ can be any suitable groups. In a preferred embodiment, $R_2$, $R_3$, $R_4$, $R_5$, $R_6$, and $R_7$ are independently selected from the group consisting of hydrogen, hydroxymethyl, and alkoxymethyl. Suitable compounds include, but are not limited to, melamine, methylolated melamines, and alkoxymethyl melamines (e.g., etherified methylol melamines). Such a precondensate can be made by reacting the phosphonium salt with one melamine compound or a mixture of two or more melamine compounds.

The reactant mixture used to make the precondensate described above can contain any suitable amounts of the phosphonium salt and the melamine compound. The amounts of the phosphonium salt and the melamine compound in the reactant mixture can be expressed through a molar ratio of the two components in the reactant mixture. However, as will be understood by those skilled in the art (and as illustrated below), it is the phosphonium cation(s) in the phosphonium salt that participate in the reaction between the phosphonium salt and the melamine compound. (The phosphonium salt's counterion is simply there to balance the charge.) Thus, in order to accurately express the relative amount of each reactive component present in the reactant mixture, the molar amount of the phosphonium salt present in the reactant mixture should be normalized to express the number of reactive phosphonium cations contributed to the reactant mixture by the phosphonium salt. This can be simply done by taking the number of moles of the phosphonium salt present in the reactant mixture and multiplying this value by the number of phosphonium cations present in a molecule of the phosphonium salt. For example, if the reactant mixture contains one mole of a phosphonium salt containing two phosphonium cations per molecule (e.g., tetrahydroxymethyl phosphonium sulfate), then the reactant mixture will contain two moles of reactive phosphonium cations ([1 mole of tetrahydroxymethyl phosphonium sulfate]×[2 phosphonium cations per molecule of tetrahydroxymethyl phosphonium sulfate]=2 moles of phosphonium cations). If two or more phosphonium salts are present in the reactant mixture, then this calculation must be separately performed for each phosphonium compound. The results from each calculation can then be added to arrive at the total number of moles of reactive phosphonium cations present in the reactant mixture. The figure representing the number of moles of phosphonium cations present in the reactant mixture and the molar amount of the melamine compound can then be used to express the relative amounts of the phosphonium salt and the melamine compound in the reactant mixture (e.g., a molar ratio of phosphonium cations to melamine compound), as discussed below.

Preferably, the phosphonium salt and the melamine compound are present in the reactant mixture in an initial molar ratio of phosphonium cations to melamine compound of about 50:1 or less, about 40:1 or less, about 30:1 or less, about 25:1 or less, about 20:1 or less, about 15:1 or less, about 10:1 or less, or about 8:1 or less. The phosphonium salt and the melamine compound preferably are present in the reactant mixture in an initial molar ratio of phosphonium cations to melamine compound of about 3:1 or more or about 6:1 or more. In a preferred embodiment, the phosphonium salt and the melamine compound are present in the reactant mixture in an initial molar ratio of phosphonium cations to melamine compound of about 50:1 to about 3:1. In another preferred embodiment, the phosphonium salt and the melamine compound are present in the reactant mixture in an initial molar ratio of phosphonium cations to melamine compound of about 40:1 to about 3:1, about 30:1 to about 3:1, about 25:1 to about 3:1, about 20:1 to about 3:1, about 15:1 to about 3:1 (e.g., about 15:1 to about 6:1), about 10:1 to about 3:1, or about 8:1 to about 3:1 (e.g., about 6:1).

The reactant mixture used to produce the precondensate of a phosphonium salt and a melamine compound can contain other components in addition to the phosphonium salt and the melamine compound described above. For example, the reactant mixture can contain other nitrogenous compounds, such as urea, guanazole, biguanide, or alkylene ureas. While these other nitrogenous compounds can be present in the reactant mixture, they are typically present in a relatively small amount as compared to the amount of the melamine compound present in the reactant mixture. The reactant mixture can also contain a surfactant, such as an alkoxylated alcohol, which aids in the dispersion of the melamine compound. The reactant mixture can also contain one or more pH buffers, such as acetate salts (e.g., sodium acetate), phosphate salts (e.g., alkaline metal phosphate salts), tertiary amines, and amino alcohols.

The process can utilize one of the above-described phosphonium compounds, or the process can utilize a mixture of two or more such phosphonium compounds. For example, the process can utilize only a phosphonium salt or a precondensate as described above. Alternatively, the process can utilize a mixture of different phosphonium salts, a mixture of precondensates, or a mixture of one or more phosphonium salts and one or more precondensates.

The process of the invention utilizes a nitrogen-containing cross-linking compound to react with the phosphonium compound to produce a first phosphorus-containing polymer. The nitrogen-containing cross-linking compound preferably comprises two or more nitrogen-hydrogen (N—H) bonds. In the cross-linking compound, these hydrogen atoms can be bonded to the same nitrogen atom (such as in ammonia), or the hydrogen atoms can be bonded to different nitrogen atoms. Suitable cross-linking compounds include, for example, urea, a guanidine (i.e., guanidine, a salt thereof, or a guanidine derivative), guanyl urea, glycoluril, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. Preferably, the nitrogen-containing cross-linking compound is selected from the group consisting of ammonia, urea, alkylene urea compounds, melamine, guanidine, guanidine derivatives, dicyandiamide, and mixtures thereof.

In the process, the phosphonium compound and the nitrogen-containing cross-linking compound are reacted in a condensation reaction to produce a first phosphorus-containing polymer. In this condensation reaction, hydrogen-bearing nitrogen atoms in the cross-linking compound react with hydroxyalkyl groups on the phosphonium compound to form a link and eliminate water. The exact functional group produced by the reaction will vary depending on the nature of the cross-linking compound used. Further, because the nitrogen-containing cross-linking compound contains at least two hydrogen atoms bonded to nitrogen, the cross-linking compound can react with at least two hydroxyalkyl groups, thereby allowing the polymer chain to be propagated. In this reaction step, the phosphonium compound and the nitrogen-containing cross-linking compound can be reacted in any suitable amount. The amounts of the two components can be expressed in terms of the initial weight ratio of the two components. In a preferred embodiment, the phosphonium compound and the cross-linking compound are present in the treatment composition in an initial weight ratio of about 1:2 or more, about 1:1 or more, about 3:2 or more, about 2:1 or more, or about 3:1 or more. In another preferred embodiment, the phosphonium compound and the cross-linking compound are present in the treatment composition in an initial weight ratio of phosphonium compound to cross-linking compound of about 10:1 or less, about 9:1 or less, about 8:1 or less, about 7:1 or less, about 6:1 or less, about 5:1 or less, about 4:1 or less, or about 3:1 or less. Thus, in certain preferred embodiments, the phosphonium compound and the cross-linking compound are present in the treatment composition in an initial weight ratio of phosphonium compound to cross-linking compound of about 1:2 to about 10:1 (e.g., about 1:2 to about 5:1), about 1:1 to about 10:1 (e.g., about 1:1 to about 8:1, about 1:1 to about 6:1, about 1:1 to about 5:1, or about 1:1 to about 4:1), about 3:2 to about 10:1 (e.g., about 3:2 to about 8:1, about 3:2 to about 4:1), or about 2:1 to about 10:1 (e.g., about 2:1 to about 8:1, about 2:1 to about 6:1, about 2:1 to about 5:1, about 2:1 to about 4:1, or about 2:1 to about 3:1). As noted above, more than one nitrogen-containing cross-linking compound can be used. If multiple nitrogen-containing cross-linking compounds are used, then the ratios above refer to the total amount of all of the nitrogen-containing cross-linking compounds.

In order to accelerate the condensation reaction between the phosphonium compound and the cross-linking compound, the treatment composition preferably is heated as described in the process above. The elevated temperature used in this step can be any suitable temperature that results in the reaction of the phosphonium compound and cross-linking compound to the desired degree. Suitable temperatures for this step will vary depending upon many factors, but suitable conditions can range from temperatures of about 100° C. (212° F.) to about 150° C. (300° F.).

In the process, a circulating flow of the treatment composition is created by circulating the treatment composition from the reservoir through a passage. The textile material is passed through the circulating flow of treatment composition so that it becomes entrained in the flow and circulated through the treatment composition in the reservoir. The resulting circulation of the textile material ensures that the textile material is thoroughly and evenly bathed in the treatment composition. This helps to ensure that the phosphorus-containing polymer produced by the reaction of the phosphonium compound and the nitrogen-containing cross-linking compound is well deposited on the surface of the textile fibers in the textile material.

While not wishing to be bound to any particular theory, it is believed that the phosphonium compound and the nitrogen-containing cross-linking compound begin to react in the treatment composition and form small scale polymer particles that are suspended or dispersed in the treatment composition. As the treatment composition and the textile material are circulated, it is believed that these small scale polymer particles deposit on and become adhered to the surface of the fibers in the textile material, where they can continue to grow due to the formation of additional phosphorus-containing polymer from the reactants in the treatment composition. The result is a textile material having a finish comprising the phosphorus-containing polymer that exhibits a unique morphology. More specifically, the treated textile material has a finish comprising a plurality of polymer microstructures or microprotuberances on the surface of the textile fibers as described above and depicted in FIGS. 7-10.

Furthermore, while not wishing to be bound to any particular theory, it is believed that the solution/disperse phase reaction between the phosphonium compound and the nitrogen-containing cross-linking compound hypothesized above also produces a flame retardant, phosphorus-containing polymer having a different molecular structure than that possessed by polymers made using conventional processes. In particular, it is believed that the resulting polymer has a much higher cross-link density and a much lower content of residual hydroxyalkyl groups than a polymer produced by a conventional process. Again, while not wishing to be bound to any particular theory, it is believed that the solution/disperse phase reaction system provides conditions under which the thermodynamically favored cross-linking reaction can proceed to a greater extent than in conventional processes. The greater the number of cross-links formed in the polymer, the lower the residual hydroxyalkyl groups (the hydroxy groups are eliminated in the cross-linking reaction). It is Applicants' belief that, in the conventional process for creating phosphorus-containing polymers, the cross-linking reaction is kinetically disadvantaged because of the relatively short reaction time and the fact that the reactants are immobilized on the textile material's surface. In the solution/disperse phase reaction system of the present process, these kinetic disadvantages are not present, which allows the thermodynamically favored cross-linking reaction to proceed nearly to completion.

After the textile material has been circulated through the reservoir and the desired amount of phosphorus-containing polymer has deposited on the surface of the textile material, the textile material preferably is exposed to a Brønsted base and exposed to an oxidizing agent. The textile material can be exposed to the Brønsted base and the oxidizing agent in any suitable order. For example, the textile material can be first exposed to the oxidizing agent and then exposed to the Brønsted base. Alternatively, the textile material can be first exposed to the Brønsted base and then exposed to the oxidizing agent. This latter embodiment is more fully described in U.S. Patent Application No. 61/831,131, the disclosure of which is hereby incorporated by reference.

The Brønsted base used in the process can be any suitable base, but strong bases, such as alkalis, are preferred. For example, sodium hydroxide (soda), potassium hydroxide (potash), calcium hydroxide (lime), or any combination thereof can be used. The Brønsted base typically is provided in the form of an aqueous solution that is applied to the textile material or a medium in which the textile material is submerged. The Brønsted base can be contained in this solution in any suitable amount, but preferably the concentration of the base is great enough to yield a solution having a pH of about 12 or greater (e.g., about 13 or greater, or about 14). Preferably, the textile material is exposed to the Brønsted base under conditions sufficient to raise the pH of the textile material and/or the medium in which the textile material is contained to about 6 or more.

The textile material preferably is exposed to the oxidizing agent in order to oxidize at least a portion of the phosphorus atoms in the phosphorus-containing polymer to phosphine oxide moieties. Suitable oxidizing agents include, but are not limited to, oxygen (e.g., gaseous oxygen), hydrogen peroxide, sodium perborate, sodium hypochlorite, percarbonate (e.g., alkaline metal percarbonates), ozone, peracetic acid, and mixtures or combinations thereof. Suitable oxidizing agents also include compounds that are capable of generating hydrogen peroxide or peroxide species, which compounds can be used alone or in combination with any of the oxidizing agents listed above. In a preferred embodiment, the oxidizing agent is selected from the group consisting of hydrogen peroxide, sodium perborate, or sodium hypochlorite, and combinations thereof, with hydrogen peroxide being particularly preferred. The amount of oxidant can vary depending on the actual materials used, but typically the oxidizing agent is incorporated in a solution containing about 5% or more, about 10% or more, about 15% or more, about 20% or more, about 25% or more, or about 30% or more by weight of the oxidizing agent.

The textile material can be exposed to the Brønsted base and the oxidizing agent in the same apparatus in which the first six steps of the process are performed. For example, the apparatus can be drained of the remaining treatment composition, the fabric can optionally be rinsed, and then the textile material can be exposed to the Brønsted base and the oxidizing agent in the apparatus in the desired order. As with the initial treatment of the textile material, the textile material preferably is passed through a circulating flow of a treatment composition containing the Brønsted base or the oxidizing agent. Alternatively, the textile material resulting from step (f) can be removed from the apparatus, optionally dried, and exposed to the Brønsted base and the oxidizing agent in a separate apparatus, such as a padding apparatus.

After the treated textile material has been contacted with the Brønsted base solution and the oxidizing agent as described above, the treated textile material typically is rinsed to remove any unreacted components from the treatment composition, any residual oxidizing agent, and any residual components from the neutralizing solution. The treated textile material can be rinsed in any suitable medium, provided the medium does not degrade the phosphorus-containing polymer. Typically, the treated textile material is rinsed in water (e.g., running water) until the pH of the water is relatively neutral, such as a pH of about 6 to about 8, or about 7. After rinsing, the treated textile material is dried using suitable textile drying conditions.

The process of the invention can be performed in any suitable apparatus. Preferably, the process is performed in a jet dyeing machine, which is specifically designed to circulate the textile material through the treatment composition in the manner described above.

After treating the textile material in the manner described above (either with or without the subsequent treatment with the Brønsted base and the oxidizing agent), the textile material can be further treated a second time with a flame retardant, phosphorus-containing polymer in a more conventional padding process. The flame retardant, phosphorus-containing polymer applied in such a process can be produced using any suitable combination of the reactants described above. Representative padding processes suitable for use in such an embodiment are described, for example, in U.S. Pat. Nos. 7,713,891, 8,012,890, and 8,012,891 and co-pending U.S. patent application Ser. Nos. 13/616,231 and 61/831,131, each of which is hereby incorporated by reference.

If desired, the textile material can be treated with one or more softening agents (also known as "softeners") to improve the hand of the treated textile material. The softening agent selected for this purpose should not have a deleterious effect on the flammability of the resultant fabric. Suitable softeners include polyolefins, alkoxylated alcohols (e.g., ethoxylated alcohols), alkoxylated ester oils (e.g., ethoxylated ester oils), alkoxylated fatty amines (e.g., ethoxylated tallow amine), alkyl glycerides, alkylamines, quaternary alkylamines, halogenated waxes, halogenated esters, silicone compounds, and mixtures thereof. In a preferred embodiment, the softener is selected from the group consisting of cationic softeners and nonionic softeners.

The softener can be present in the textile material in any suitable amount. One suitable means for expressing the amount of softener that is applied to the textile material is specifying the amount of softener that is applied to the textile material as a percentage of the weight of the untreated textile material (i.e., the textile material prior to the application of the softener described herein). This percentage can be calculated by taking the weight of softener solids applied, dividing this value by the weight of the untreated textile material, and multiplying by 100%. Preferably, the softener is present in the textile material in an amount of about 0.1% or more, about 0.2% or more, or about 0.3% or more, by weight, based on the weight of the untreated textile material. Preferably, the softener is present in the textile material in an amount of about 10% or less, about 9% or less, about 8% or less, about 7% or less, about 6% or less, or about 5% or less, by weight, based on the weight of the untreated textile material. Thus, in certain preferred embodiments, the softener is present in the textile material in an amount of about 0.1% to about 10%, about 0.2% to about 9% (e.g., about 0.2% to about 8%, about 0.2% to about 7%, about 0.2% to about 6%, or about 0.2% to about 5%), or about 0.3% to about 8% (e.g., about 0.3% to about 7%, about 0.3% to about 6%, or about 0.3% to about 5%), by weight, based on the weight of the untreated textile material.

The softener can be applied to the textile material at any suitable time. For example, the softener can be added to the treatment composition described above (i.e., the treatment composition comprising the precondensate compound and the cross-linking composition) so that the softener is applied to the textile material at the same time as the phosphorus-containing polymer. The softener can also be applied to the textile material following application of the flame retardant, phosphorus-containing polymer as described above. In this instance, the softener typically would be applied after the textile material has been treated, dried, cured, oxidized, and, if desired, rinsed as described above. In a preferred embodiment of the method described herein, the softener is applied to the textile material in two separate applications. The first application is incorporated into the treatment composition (i.e., the treatment composition comprising the phosphonium compound and the cross-linking composition), and the second application is applied to the dry, treated textile material following the steps of treatment, drying, curing, oxidation, rinsing, and drying as described above. In this embodiment, the softener is divided among the two applications so that the final amount of softener applied to the treated textile material falls within one of the ranges described above.

To further enhance the textile material's hand, the textile material can optionally be treated using one or more mechanical surface treatments. A mechanical surface treatment typically relaxes stress imparted to the fabric during curing and fabric handling, breaks up yarn bundles stiffened during curing, and increases the tear strength of the treated fabric. Examples of suitable mechanical surface treatments include treatment with high-pressure streams of air or water (such as those described in U.S. Pat. No. 4,918,795, U.S. Pat. No. 5,033,143, and U.S. Pat. No. 6,546,605), treatment with steam jets, needling, particle bombardment, ice-blasting, tumbling, stone-washing, constricting through a jet orifice, and treatment with mechanical vibration, sharp bending, shear, or compression. A sanforizing process may be used instead of, or in addition to, one or more of the above processes to improve the fabric's hand and to control the fabric's shrinkage. Additional mechanical treatments that may be used to impart softness to the treated fabric, and which may also be followed by a sanforizing process, include napping, napping with diamond-coated napping wire, gritless sanding, patterned sanding against an embossed surface, shot-peening, sand-blasting, brushing, impregnated brush rolls, ultrasonic agitation, sueding, engraved or patterned roll abrasion, and impacting against or with another material, such as the same or a different fabric, abrasive substrates, steel wool, diamond grit rolls, tungsten carbide rolls, etched or scarred rolls, or sandpaper rolls.

The articles and treated textile materials of the invention are believed to exhibit good protection against flash fire and arc flash hazards. Accordingly, the articles and treated textile materials are believed to be particularly well-suited for use in the production of protective garments, such as those worn by industrial workers at risk for exposure to flash fires and arc flashes. When tested in accordance with ASTM D6413 entitled "Standard Test Method for Flame Resistance of Textiles (vertical test)", the textile materials of the invention typically exhibit very short char length with zero afterflame. Typical char lengths exhibited by the textile materials are about 1 inch (2.5 cm) to about 2.5 inches (6.4 cm), which indicates that the textile materials exhibit relatively high mechanical strength even after exposure to the flame. Furthermore, the textile materials can withstand many repeated home and/or industrial launderings. For example, the textile materials of the invention typically (and preferably) exhibit the flame resistant properties described above after many (e.g., 50 or more, or 100) home and/or industrial launderings.

In another series of embodiments, the invention provides a garment comprising one or more fabric panels. The one or more fabric panels can be joined (e.g., sewn) together in such a way as to enclose an interior volume, which interior volume is intended to be occupied by a wearer or at least a portion of the anatomy of a wearer. Suitable examples of such garments include, but are not limited to, shirts, jackets, vests, pants, overalls, coveralls, hoods, and gloves. Alternatively, the garment need not be constructed so that it encloses an interior volume. Rather, the garment can be constructed so that a wearer can securely fasten it to his or her body so that it covers and protects at least a portion of his or her anatomy. Suitable examples of such garments include, but are not limited to aprons, bibs, chaps, and spats.

In such embodiments of the invention, at least one of the fabric panels of the garment comprises an article or treated textile material described above (e.g., a treated textile material prepared by the process described above). Preferably, if the garment comprises multiple fabric panels, all of the fabric panels comprise an article or treated textile material described above. In a specific embodiment of a garment, the garment is a shirt comprising a plurality of fabric panels. At least one of the fabric panels defines a body covering portion of the shirt, and at least two of the fabric panels define sleeves attached to the body covering portion of the shirt. As noted above, at least one of the fabric panels of the shirt comprises an article or treated textile material described above. In another specific embodiment of such a garment, the garment is a pant comprising a plurality of fabric panels. At least two of the fabric panels define leg covering portions of the pant. As noted above, at least one of the fabric panels comprises an article or treated textile material described above.

In another embodiment, the invention provides a method for protecting an individual from infrared radiation that can be generated during an electrical arc flash. In this embodiment, the method comprises the step of positioning an article or treated textile material between an individual and an apparatus capable of producing an electrical arc flash. The article or treated textile material preferably is an article or textile material according to the invention (e.g., a treated textile material prepared by the process described above).

In this method embodiment of the invention, the article or treated textile material can be positioned at any suitable point between the individual and the apparatus. However, in order to ensure that it is positioned to afford the greatest degree of protection to the individual, the article or treated textile material preferably forms part of a garment worn by the individual. Suitable garments include, but are not limited to, shirts, pants, coats, hoods, aprons, and gloves. In a preferred embodiment, the outward-facing textile portions of a garment worn by the individual (i.e., those portions of the garment facing towards the apparatus when the garment is being worn by the individual) consist essentially of (or even more preferably consist of) an article or treated textile material according to the invention.

The method described above can be used to protect an individual from an arc flash produced by any apparatus. Typically, the apparatus is a piece of electrical equipment. Preferably, the apparatus is capable of producing an arc flash having an incident energy of about 1.2 calories/cm$^2$ or more (about 5 J/cm$^2$ or more) at a position at which the individual is located. More preferably, the apparatus is capable of producing an arc flash having an incident energy of about 4 calories/cm$^2$ or more (about 17 J/cm$^2$ or more) at a position at which the individual is located. The apparatus preferably is capable of producing an arc flash having an incident energy of about 8 calories/cm$^2$ or more (about 33 J/cm$^2$ or more) at a position at which the individual is located. An arc flash having an incident energy such as those described above (especially an arc flash having an incident energy of about 4 calories/cm$^2$ or more or about 8 calories/cm$^2$ or more) is capable of inflicting significant injury (e.g., second degree burns) to the unprotected or under-protected skin of an individual exposed to the arc flash.

In order to protect an individual from high energy arc flash exposure, such as 25 cal/cm$^2$ (105 J/cm$^2$) to 60 cal/cm$^2$ (250 J/cm$^2$), multiple layers of the article or textile material described above can be used, or the article or textile material can be used in combination with other textile materials or insulation layers. For example, in one such embodiment, the article or textile material described above can be used as an outer layer with other arc flash resistant fabrics and/or insulation materials underlying the article or textile material (i.e., between the textile material and the wearer). In such an embodiment, it is believed that the high break-open resistance of the textile materials of the invention will provide a multilayer structure that affords desirable levels of arc flash protection and maintains its mechanical integrity following exposure to an arc flash or flame.

The following examples further illustrate the subject matter described above but, of course, should not be construed as in any way limiting the scope thereof.

Example 1

This example demonstrates the synthesis of a phosphorus-containing polymer that is believed to be equivalent to the polymer produced in a conventional pad-cure treatment of fabric with a flame retardant, phosphorus-containing polymer. Approximately 1.76 g (29.3 mmol) of urea was dissolved in 4 mL of water in a vessel. Approximately 10 g of a tetrakis-(hydroxymethyl)phosphonium sulfate-urea precondensate (PYROSAN® CFR from Emerald Performance Materials) was added to the same vessel. Then, approximately 0.6 g of a 12% aqueous sodium hydroxide solution was added to the vessel. The pH of the solution was in the range of 5.5-6.0. Approximately 10 g of the resulting solution was transferred to a glass Petri dish, and the Petri dish was placed in a forced air oven maintained at temperature of approximately 175° C. for 10 min. The resulting solid was removed from the Petri dish and ground to a fine powder. The powder was poured into 40 mL of an aqueous solution containing 10% hydrogen peroxide and the pH was adjusted to approximately 10 using a 12% aqueous sodium hydroxide solution. The suspension was stirred for 15 min and the solid was filtered off, washed with water, and air dried.

Example 2

This example demonstrates the synthesis of a phosphorus-containing polymer according to the invention. Specifically, this example demonstrates the production of a polymer that is believed to be similar to the polymer that is produced by treating a textile material with a flame retardant phosphorus-containing polymer in a dye jet as described in this application. Approximately 5.6 g (93.3 mmol) of urea was dissolved in 100 mL water in a vessel. Approximately 28.5 g of a tetrakis-(hydroxymethyl)phosphonium sulfate-urea precondensate (PYROSAN® CFR from Emerald Performance Materials) was added to the same vessel. The resulting solution and approximately 900 mL of water were then added to a laboratory dye jet (Mathis AG©). Then, approximately 8 g of a 12% aqueous sodium hydroxide solution was added to the dye jet. The pH of the liquor in the dye jet was in the range of 5.0-5.5. The liquor was heated to approximately 130° C. and circulated through the dye jet at the elevated temperature for approximately 60 min. A solid precipitate formed in the dye jet. The resulting solid was filtered off, washed with water, and air dried. After grinding to a fine powder, the solid was poured into 40 g of an aqueous solution containing 10% hydrogen peroxide and the pH was adjusted to 10 using a 12% aqueous sodium hydroxide solution. The suspension was stirred for 15 min and the resulting solid was filtered off, washed with water, and air dried.

The polymers of Example 1 and Example 2 were then analyzed by infrared (IR) spectroscopy and solid state $^{13}C$ nuclear magnetic resonance (NMR) to characterize differences between the two polymers. The C—H stretching frequency of a —$CH_2$—OH group is in the range of 2,800-2,950 $cm^{-1}$, whereas the C—H stretching frequency of a —$CH_2$—NH—R group (i.e., the group that results from the reaction between the methylol group of the precondensate and the urea) is 3,000 $cm^{-1}$ or greater. The IR spectrum of the polymer of Example 2 showed only small peaks in the range of 2,800-2,950 $cm^{-1}$, and these peaks were indistinguishable from the background noise in the IR spectrum. Applicants believe these results demonstrate that the polymer of Example 2 contains relatively little residual hydroxyalkyl groups. By way of contrast, the IR spectrum of the polymer of Example 1 showed sharp and strong peaks at 2,850 $cm^{-1}$ and 2,917 $cm^{-1}$, which Applicants believe to be indicative of a significant amount of residual hydroxyalkyl groups remaining in the polymer. The amount of residual hydroxyalkyl groups was estimated by comparing the integrated peak area of the C—H stretching mode (at 2,800-2,950 $cm^{-1}$) and the integrated peak area of the C—H bending mode (at 1,400-1,550 $cm^{-1}$). These calculations reveal that approximately 20% of the functional groups attached to the phosphorus atoms in the polymer of Example 1 were hydroxyalkyl groups.

The solid state $^{13}C$ NMR confirm the IR findings. The peak for the carbon atom in a —$CH_2$—OH group has a chemical shift of approximately 58 ppm. The NMR spectrum for the polymer of Example 2 did not reveal a distinguishable peak at a chemical shift of approximately 58 ppm, which Applicants believe indicates that the polymer of Example 2 contains relatively little residual hydroxyalkyl groups. This finding is consistent with the findings from the IR spectroscopy studies described above. More specifically, the solid state $^{13}C$ NMR studies conducted by Applicants can detect as little as 5% residual hydroxyalkyl groups in the polymer. Therefore, the lack of a detectable peak in the NMR spectrum demonstrates that less than 5% of the functional groups attached to the phosphorus atoms in the polymer of Example 2 were hydroxyalkyl groups. By way of contrast, the NMR spectrum for the polymer of Example 1 showed a clearly distinguishable peak at a chemical shift of approximately 58 ppm, which is consistent with the findings from the IR spectroscopy studies described above.

Example 3

This example demonstrates the production of a treated textile material using a conventional pad-cure treatment with a flame retardant, phosphorus-containing polymer. Approximately 70 g (1.17 mol) of urea was dissolved in 450 mL of water in a vessel. Approximately 400 g of a tetrakis-(hydroxymethyl)phosphonium sulfate-urea precondensate (PYROSAN® CFR from Emerald Performance Materials) was added to the vessel. Approximately 24 g of a 12% aqueous sodium hydroxide solution was also added to the vessel. The pH of the solution was in the range of 5.5-6.0. Approximately 500 g of a 100% cotton knit fabric was padded through the above-described solution and squeezed between pressurized rolls. The wet pick-up was approximately 80% based on the weight of fabric. The fabric was dried in forced air oven at a temperature of approximately 121° C. for 3 min. The finish on the fabric was then cured in a forced air oven at a temperature of approximately 177° C. for 3 min. The cured fabric was immersed in a 4% aqueous hydrogen peroxide solution for 2 min and then immersed in a 4% aqueous sodium hydroxide solution for 2 min. The fabric was then thoroughly washed with water and tumble dried.

Example 4

This example demonstrates the production of a treated textile material according to the invention. Specifically, this example demonstrates the production of a textile material that is first treated with a flame retardant phosphorus-containing polymer in a dye jet. Approximately 8.7 g (0.145 mol) of urea was dissolved in 100 mL of water in a vessel. Approximately 44 g of a tetrakis-(hydroxymethyl)phosphonium sulfate-urea precondensate (PYROSAN® CFR from Emerald Performance Materials) was added to the vessel. The resulting solution and approximately 900 mL of water were added to a laboratory dye jet (Mathis AG©) containing approximately 50 g of a 100% cotton knit fabric. Then, approximately 12 g of a 12% aqueous sodium hydroxide solution was added to the dye jet. The pH of the liquor in the dye jet was in the range of 5.5-6. The liquor was heated to a temperature of approximately 130° C. and the fabric was circulated through the dye jet for 60 min. The fabric was over-flow rinsed and stirred in 1000 mL of an aqueous solution containing 2% hydrogen peroxide and 1% sodium hydroxide for 10 min. The fabric was then over-flow rinsed and tumble dried.

The end product was an article (e.g., a treated textile material) having a flame retardant, phosphorus-containing polymer disposed on the surface of a textile material. The article contained a plurality of microprotuberances similar to those shown in FIGS. 7 and 8.

Example 5

This example demonstrates the production of a treated textile material according to the invention. Specifically, this example demonstrates the production of a textile material that is first treated with a flame retardant phosphorus-containing polymer in a dye jet and then treated with a flame retardant phosphorus-containing polymer in a pad-cure treatment. Approximately 5.6 g (93.3 mmol) of urea was dissolved in 100 mL of water in a vessel. Approximately 28.5 g of a tetrakis-(hydroxymethyl)phosphonium sulfate-urea precondensate (PYROSAN® CFR from Emerald Performance Materials) was added to the vessel. The resulting solution and approximately 900 mL of water were added to a laboratory dye jet (Mathis AG©) containing approximately 51.5 g of a 100% cotton knit fabric. Then, approximately 7.75 g of a 12% aqueous sodium hydroxide solution was added to the dye jet. The pH of the liquor in the dye jet was in the range of 5.0-5.5. The liquor was heated to a temperature of approximately 130° C. and the fabric was circulated through the dye jet for 60 min. The fabric was over-flow rinsed and tumble dried.

Approximately 5.3 g (88.3 mmol) of urea was dissolved in 230 mL of water in a separate vessel. Approximately 120 g of a tetrakis-(hydroxymethyl)phosphonium sulfate-urea precondensate (PYROSAN® CFR from Emerald Performance Materials) was added to the vessel. Approximately 7.2 g of a 12% aqueous sodium hydroxide solution was then added to the vessel. The pH of the solution was in the range of 5.5-6.0. The fabric obtained from the dye jet treatment described in the preceding paragraph was padded through the resulting solution and squeezed between pressurized rolls. The wet pick-up was approximately 80% based on the weight of fabric. The fabric was dried in a forced air oven at a temperature of approximately 121° C. for 3 min. The finish on the fabric was then cured in a forced air oven at a temperature of approximately 177° C. for 3 min. The cured fabric was immersed in a 4% aqueous hydrogen peroxide solution for 2 min and then immersed in a 4% aqueous sodium hydroxide solution for 2 min. The fabric was then thoroughly washed with water and tumble dried.

The end product was an article (e.g., a treated textile material) having a flame retardant, phosphorus-containing polymer disposed on the surface of a textile material. The article contained a plurality of microprotuberances similar to those shown in FIGS. 9 and 10.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. An article comprising:
   (a) a textile material, the textile material comprising a plurality of textile fibers, each of the textile fibers having a surface; and
   (b) a flame retardant, phosphorus-containing polymer disposed on at least a portion of the surface of at least a portion of the textile fibers, wherein at least a portion of the flame retardant, phosphorus-containing polymer is present in the form of a plurality of microprotuberances protruding from the surface of the textile fibers, wherein each microprotuberance has a diameter of about 10 microns or less.

2. The article of claim 1, wherein microprotuberances have a primary size of about 100 nm to about 5 microns.

3. The article of claim 1, wherein at least a portion of the microprotuberances are agglomerated to form agglomerates, and the agglomerates have a diameter of about 100 microns or less.

4. The article of claim 1, wherein the flame retardant, phosphorous containing polymer is produced by a process comprising the steps of:
   (a) providing a phosphonium compound comprising at least one phosphonium moiety, the phosphonium moiety conforming to the structure of Formula (I)

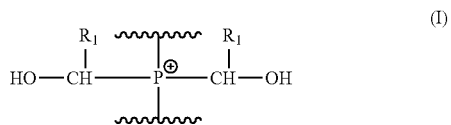

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl;
(b) providing a nitrogen-containing cross-linking compound, the nitrogen-containing cross-linking compound comprising two or more nitrogen-hydrogen bonds;
(c) reacting the phosphonium compound and the nitrogen-containing cross-linking compound in a condensation reaction to produce a first intermediate polymer, the first intermediate polymer comprising a plurality of phosphorus atoms; and
(d) oxidizing the first intermediate polymer to convert at least a portion of the phosphorus atoms in the first intermediate polymer to a pentavalent, phosphine oxide state, thereby producing a flame-retardant, phosphorus-containing polymer.

5. The article of claim 4, wherein the phosphonium compound is selected from the group consisting of:
(a) phosphonium compounds conforming to the structure of Formula (I)

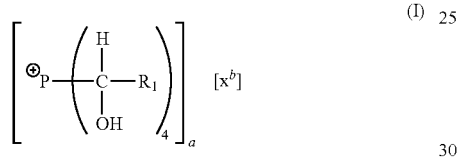

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X is an anion selected from the group consisting of chloride, sulfate, hydrogen sulfate, phosphate, acetate, carbonate, bicarbonate, borate, and hydroxide; b is the charge of the anion X; and a is equal to (−b);
(b) phosphonium precondensates made by reacting one or more phosphonium compounds conforming to the structure of Formula (I) with a cross-linking compound; and
(c) mixtures thereof.

6. The article of claim 5, wherein the phosphonium compound is a phosphonium precondensate made by reacting a tetrahydroxymethyl phosphonium salt with urea.

7. The article of claim 4, wherein the nitrogen-containing cross-linking compound is urea.

8. The article of claim 1, wherein at least a portion of the textile fibers are cellulosic fibers.

9. The article of claim 8, wherein about 50% or more of the textile fibers are cellulosic fibers.

10. The article of claim 1, wherein at least a portion of the textile fibers are thermoplastic synthetic fibers.

11. The article of claim 1, wherein the textile material is a knit textile material.

12. An article comprising:
(a) a textile material, the textile material comprising a plurality of textile fibers, each of the textile fibers having a surface; and
(b) a flame retardant, phosphorus-containing polymer disposed on at least a portion of the surface of at least a portion of the textile fibers, wherein the flame retardant, phosphorous containing polymer is produced by a process comprising the steps of:
(1) providing a phosphonium compound comprising at least one phosphonium moiety, the phosphonium moiety conforming to the structure of Formula (I)

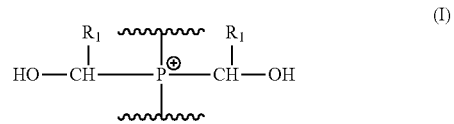

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl;
(2) providing a nitrogen-containing cross-linking compound, the nitrogen-containing cross-linking compound comprising two or more nitrogen-hydrogen bonds;
(3) reacting the phosphonium compound and the nitrogen-containing cross-linking compound in a condensation reaction to produce a first intermediate polymer, the first intermediate polymer comprising a plurality of phosphorus atoms; and
(4) oxidizing the first intermediate polymer to convert at least a portion of the phosphorus atoms in the first intermediate polymer to a pentavalent, phosphine oxide state, thereby producing a flame-retardant, phosphorus-containing polymer comprising a plurality of phosphorus atoms having functional groups attached thereto; and
wherein 10% or less of the functional groups attached to the phosphorus atoms in the flame retardant, phosphorus-containing polymer are hydroxyalkyl groups.

13. The article of claim 12, wherein about 5% or less of the functional groups attached to the phosphorus atoms in the flame retardant, phosphorus-containing polymer are hydroxyalkyl groups.

14. The article of claim 12, wherein the phosphonium compound is selected from the group consisting of:
(a) phosphonium compounds conforming to the structure of Formula (I)

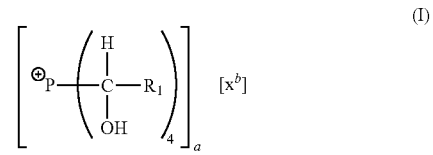

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X is an anion selected from the group consisting of chloride, sulfate, hydrogen sulfate, phosphate, acetate, carbonate, bicarbonate, borate, and hydroxide; b is the charge of the anion X; and a is equal to (−b);
(b) phosphonium precondensates made by reacting one or more phosphonium compounds conforming to the structure of Formula (I) with a cross-linking compound; and
(c) mixtures thereof.

15. The article of claim 14, wherein the phosphonium compound is a phosphonium precondensate made by reacting a tetrahydroxymethyl phosphonium salt with urea.

16. The article of claim 12, wherein the nitrogen-containing cross-linking compound is urea.

17. The article of claim 12, wherein at least a portion of the textile fibers are cellulosic fibers.

18. The article of claim 17, wherein about 50% or more of the textile fibers are cellulosic fibers.

19. The article of claim 12, wherein at least a portion of the textile fibers are thermoplastic synthetic fibers.

20. The article of claim 12, wherein the textile material is a knit textile material.

21. A process for producing a treated textile material, the process comprising the steps of:
(a) providing a textile material, the textile material comprising a plurality of textile fibers, each of the textile fibers having a surface;
(b) providing a treatment composition, the treatment composition comprising:
(i) a phosphonium compound comprising at least one phosphonium moiety, the phosphonium moiety conforming to the structure of Formula (I)

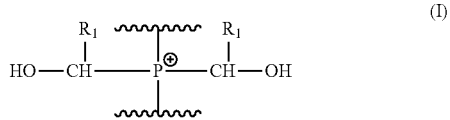

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; and
(ii) a nitrogen-containing cross-linking compound, the nitrogen-containing cross-linking compound comprising two or more nitrogen-hydrogen bonds;
(c) placing the treatment composition in a reservoir where the treatment composition is heated to a temperature sufficient for the phosphonium compound and the nitrogen-containing cross-linking compound to begin to react in a condensation reaction to produce a phosphorus-containing polymer;
(d) circulating the treatment composition from the reservoir through a passage to produce a circulating flow of the treatment composition;
(e) passing the textile material through the circulating flow of treatment composition so that the textile material is entrained in the flow and circulated through the treatment composition in the reservoir; and
(f) allowing the textile material to circulate through the reservoir for an amount of time sufficient for the phosphorus-containing polymer to deposit on at least a portion of the surface of at least a portion of the textile fibers, thereby producing a treated textile material.

22. The process of claim 21, wherein the process further comprises the step of exposing the treated textile material from step (f) to a Brønsted base.

23. The process of claim 21, wherein the process further comprises the step of exposing the treated textile material to an oxidizing agent to convert at least a portion of phosphorus atoms in the polymer to a pentavalent, phosphine oxide state.

24. The process of claim 21, wherein the phosphonium compound is selected from the group consisting of:
(a) phosphonium compounds conforming to the structure of Formula (I)

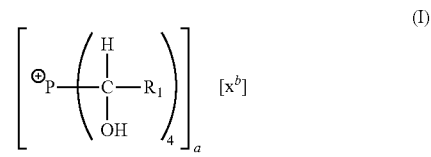

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X is an anion selected from the group consisting of chloride, sulfate, hydrogen sulfate, phosphate, acetate, carbonate, bicarbonate, borate, and hydroxide; b is the charge of the anion X; and a is equal to (−b);
(b) phosphonium precondensates made by reacting one or more phosphonium compounds conforming to the structure of Formula (I) with a cross-linking compound; and
(c) mixtures thereof.

25. The process of claim 24, wherein the phosphonium compound is a phosphonium precondensate made by reacting a tetrahydroxymethyl phosphonium salt with urea.

26. The process of claim 21, wherein the nitrogen-containing cross-linking compound is urea.

27. The process of claim 21, wherein at least a portion of the textile fibers are cellulosic fibers.

28. The process of claim 27, wherein about 50% or more of the textile fibers are cellulosic fibers.

29. The process of claim 21, wherein at least a portion of the textile fibers are thermoplastic synthetic fibers.

30. The process of claim 21, wherein the textile material is a knit textile material.

\* \* \* \* \*